(12) United States Patent
Isogai et al.

(10) Patent No.: US 7,159,307 B2
(45) Date of Patent: Jan. 9, 2007

(54) ELECTRICALLY OPERATED CHUCKING APPARATUS

(75) Inventors: Takeyoshi Isogai, Hekinan (JP); Noriaki Iwaki, Hekinan (JP); Atsushi Yamazaki, Toyota (JP)

(73) Assignee: Fuji Machine Mfg. Co. Ltd., Chiryu (JP)

( * ) Notice: Subject to any disclaimer, the term of this patent is extended or adjusted under 35 U.S.C. 154(b) by 73 days.

(21) Appl. No.: 11/119,761

(22) Filed: May 3, 2005

(65) Prior Publication Data

US 2005/0194802 A1 Sep. 8, 2005

Related U.S. Application Data

(62) Division of application No. 10/193,305, filed on Jul. 12, 2002, now Pat. No. 6,973,714.

(30) Foreign Application Priority Data

Jul. 19, 2001 (JP) .............................. 2001-220752

(51) Int. Cl.
*B23P 19/00* (2006.01)
(52) U.S. Cl. .................. 29/740; 29/741; 29/739; 29/709; 269/8; 269/71
(58) Field of Classification Search .......... 29/739–743, 29/759, 705–721; 294/2, 64.1; 901/37, 901/39; 269/8, 71, 903; 414/737, 752; 279/110, 279/134
See application file for complete search history.

(56) References Cited

U.S. PATENT DOCUMENTS

| 4,327,848 | A | 5/1982 | Weiler |
| 5,657,533 | A | 8/1997 | Fukui et al. |
| 5,822,847 | A | 10/1998 | Arakawa et al. |
| 6,493,927 | B1 | 12/2002 | Isogai et al. |
| 6,532,648 | B1 * | 3/2003 | Murakami et al. ............ 29/714 |
| 6,760,968 | B1 | 7/2004 | Mimata et al. |
| 6,973,714 | B1 * | 12/2005 | Isogai et al. .................. 29/740 |

* cited by examiner

*Primary Examiner*—Minh Trinh
(74) *Attorney, Agent, or Firm*—Oliff & Berridge, PLC

(57) ABSTRACT

An electrically operated chucking apparatus including (a) an electrically operated chuck including at least two movable members movable toward and away from each other, and at least two drive devices which include respective electrically operated actuators operable to move the at least two movable members, respectively, toward and away from each other, and (b) a control device operable to control the at least two drive devices, and wherein the control device includes: a drive control portion operable to control the at least two drive devices such that each of at least one of an actual position and an actual speed of movement of the at least two movable members changes toward a predetermined target value; and a load detecting portion operable to detect a load acting on the at least two movable members during operation of the drive control portion to control the at least two drive device. The drive control portion is arranged to command the at least two drive devices to terminate movements of the at least two movable members when the load detected by the load detecting portion has increased to a predetermined threshold.

12 Claims, 16 Drawing Sheets

ELECTRICALLY OPERATED CHUCKING APPARATUS

This is a Division of application Ser. No. 10/193,305 filed Jul. 12, 2002, now U.S. Pat. No. 6,973,714, issued Dec. 13, 2005. The entire disclosure of the prior application is hereby incorporated by reference herein in its entirety.

This application is based on Japanese Patent Application No. 2001-220752 filed on Jul. 19, 2001, the contents of which are incorporated hereinto by reference.

BACKGROUND OF THE INVENTION

1. Field of the Invention

The present invention relates to an electrically operated chucking apparatus which includes an electrically operated actuator as s drive source and which is constructed to hold an object, such as an electric or electronic component or any other member or part.

2. Discussion of Related Art

For holding or chucking an electric or electronic component, member or part, or any other object, there is known an electrically operated chuck driven by an electrically operated actuator. In an electric-component mounting system arranged to mount electric components on a printed-wiring board or other circuit substrate, for example, such an electrically operated chuck is used by a component-mounting head operable to hold the electric component and transfer the electric component onto the board.

The electrically operated chuck is required to hold the object with high operating stability. To this end, the chuck is desirably arranged to be able to produce a sufficiently large chucking or holding force. Where the object to be held by the chuck is an electric component or any other comparatively brittle member or part, however, the holding force should not be excessively large, and should be controlled to an optimum value to assure stable holding of the object. Further, where the object is held by the chuck with a predetermined constant operating stroke of chucking jaws, a variation in the dimension of a gripping portion of the object at which the object is held will cause a variation in the holding force applied to the object, leading to a problem of deteriorated operating stability of the chuck.

One considered solution to the problem indicated above is to interpose an elastic body such as a rubber member or a sheet spring between the gripping portion of the chuck and the gripping portion of the object. The elastic member is expected to control the holding force owing to its elasticity or elastic deformation. To reduce the amount of variation in the holding force of the chuck according to this solution, it is required to reduce the spring constant of the elastic body as much as possible. To meet this requirement, however, the required operating stoke of the chucking jaws of the chuck is inevitably increased, resulting in an undesirable increase in the size of the chuck, which is a problem in the field of technology in which space reduction is desired in designing an assembly or equipment including the electrically operated chuck. In addition, a decrease in the spring constant of the elastic body tends to deteriorate the accuracy of positioning of the object by the chuck when the chuck is opened to release the object. Namely, the resiliency of the elastic body may displace the object once positioned by the closed chuck. In this respect, the chuck using an elastic body is not suitable in the field of art requiring a high degree of positioning accuracy of the object.

SUMMARY OF THE INVENTION

It is therefore an object of the present invention to provide an electrically operated chucking apparatus which is capable of holding an object with a high degree of operating stability and which is practically operable with reduced degrees of the problems encountered in the prior art. This object may be achieved according to any one of the following modes of the present invention in the form of an electrically operated chucking apparatus, each of which is numbered like the appended claims and depends from the other mode or modes, where appropriate, for easier understanding of technical features disclosed in the present application and possible combinations of those technical features. However, it is to be understood that the invention is not limited to those technical features or combinations thereof, and that any one of a plurality of technical features described below with respect to any one mode of the invention may be a subject of the present invention, without the other technical feature or features being combined with that one feature.

(1) An electrically operated chucking apparatus comprising:

an electrically operated chuck comprising at least two movable members movable toward and away from each other, and at least two drive devices which include respective electrically operated actuators operable to move the at least two movable members, respectively, toward and away from each other; and a control device operable to control the at least two drive devices, and wherein the control device includes:

a drive control portion operable to control the at least two drive devices such that each of at least one of an actual position and an actual speed of movement of each of the at least two movable members changes toward a predetermined target value; and a load detecting portion operable to detect a load acting on the at least two movable members during operation of the drive control portion to control the at least two drive devices, the drive control portion commanding the at least two drive devices to terminate movements of the at least two movable members when the load detected by said load detecting portion has increased to a predetermined threshold.

In the electrically operated chucking apparatus constructed according to the above mode (1) of this invention, the electrically operated chuck includes the at least two movable members which are movable independently of each other, so that the electrically operated chuck can be more easily opened by a relatively large amount, than a conventional chuck which uses a mechanical opening and closing device. In this respect, the present electrically operated chucking apparatus including the electrically operated chuck is advantageous for its high capability of holding a comparatively wide variety of objects. Since the movable members can be moved independently of each other, the movable members can hold even an asymmetric object, with a high degree of operating stability.

The electrically operated chuck may include chucking members such as chucking jaws for holding the object. The movable members may include the respective chucking members, such that the chucking members are formed integrally with the movable members, for example. Alternatively, the chucking members are formed separately from the movable members, and are removably attached to the respective movable members. Where the chucking members are chucking jaws, each movable member is provided with one chucking jaw formed as an integral part thereof or attached thereto, so that the chucking jaws on the at least two movable members cooperate to hold the object. For instance, the two chucking jaws are removably attached to the respective two movable members. The chucking members may be arranged to hold a solid or hollow object, in contact with respective outer surfaces of the object, or to hold a hollow object, in contact with respective inner surfaces of the object.

The movable members are moved toward and away from each other along a single straight line or two or more straight lines. For instance, the two movable members are moved relative to each other along a straight line. Alternatively, the movable members are moved in respective radial directions toward and away from a single point on the object, for instance, toward the center point of the object. Further alternatively, the movable members are moved toward and away from each other along respective circular arcs, with pivotal motions of the movable members, or with pivotal motions of support members such as arms holding the respective movable members. Linear movements of the movable members provide a larger distance between the adjacent movable members, and an accordingly larger maximum opening and closing stroke, than circular or pivotal movements of the movable members. Accordingly, the electrically operated chuck including linearly movable members is capable of handling a wider range of size of the objects. Where the electrically operated chuck includes two or more movable members which are supported by a main body such that the movable members are linearly movable, the chuck may be arranged such that the movable members are slidably mounted on a linear guide or guides, and are moved by respective electrically operated actuators while being guided by the linear guide or guides. The drive devices for moving the movable members use, as drive sources, the electrically operated actuators such as DC servomotors, AC servomotors, stepping motors, and any other electric motors, which may be rotary motors or linear motors.

Where the electrically operated chuck includes the movable members which are linearly movable by electric motors, rotary motions of the electric motors may be converted into linear movements of the movable members by a suitable motion-converting mechanism, which may include ballscrews and ballnuts, for instance. Where the linearly movable members are moved by a linear motor or motors, the construction of the electrically operated chuck can be simplified, in the absence of a motion-converting mechanism for converting rotary motions into linear motions. Where the movable members are moved by a linear motor or motors, the electrically operated chuck may be called "linear-motor-driven chuck", and may include, for example, a linearly extending stator, a pair of movable elements or armatures movable along the stator and independently of each other, and guides arranged to guide the movable elements along the stator. In this case, the movable elements function as the movable members. Where the linear motor is used, the stator of the linear motor may function as a body portion of the chuck.

The electrically operated chucking apparatus according to the above mode (1) of the present invention has the following feature or advantage. Namely, the holding force (chucking or gripping force) by which the object is held, chucked or gripped may vary due to a variation in the dimension of the gripping portion of the object (at which the object is held), as described previously. In view of this drawback, the load acting on the movable members during their movements according to positioning commands or speed control commands is monitored to stop or terminate the movements of the movable members when the detected load on the movable members has increased to the predetermined threshold value, which corresponds to an optimum holding force produced by the electrically operated chuck to hold the object. Accordingly, the holding force is always optimized irrespective of the variation in the dimension of the gripping portion of the object, permitting even an easily elastically deformable or brittle object to be held by the chuck with a high degree of stability. The operation of the drive control portion of the control device to control the drive devices including the electrically operated actuators will be described in greater detail, with respect to the following specific modes of the present invention.

(2) An electrically operated chucking apparatus according to the above mode (1), wherein the drive control portion includes a drive-commanding portion operable to generate control commands from time to time, for commanding the at least two drive devices, so as to control at least one of the actual position and the actual speed of movement of each of the at least two movable members.

The control commands generated by the drive-commanding portion of the drive control portion may be positioning commands to command the drive devices to position the movable members, and/or speed control commands to command the drive devices to control the speeds of movements of the movable members. The drive-commanding portion applies such positioning commands and/or speed control commands to the drive devices, to move the movable members. However, the drive-commanding portion may be arranged to apply only one positioning command or speed control command which defines a final position of each movable member or a desired speed of movement of each movable member. For a higher degree of control accuracy, however, the drive-commanding portion is preferably arranged to apply positioning commands and/or speed control commands, from time to time, such that the position or speed represented by the positioning commands and/or speed control commands is gradually changed toward the predetermined target value. In this case, the drive-commanding portion may include a memory portion storing the commands to be generated at respective points of time, and a reading portion operable to read out the commands from time to time to be applied to the drive devices at the respective points of time. Alternatively, the drive-commanding portion may include a command generating portion operable to generate the commands at respective points of time, by calculation on the basis of predetermined equations and the time elapse, and apply the generated commands to the drive devices. Where the commands are applied to the drive devices from time to time, the position and/or speed of movement of each movable member represented by the commands may be changed toward the target value, either linearly at a constant rate, or continuously at a varying rate along a suitable curve (e.g., a sine curve).

(3) An electrically operated chucking apparatus according to the above mode (1) or (2), wherein the load detecting portion includes a current detecting portion operable to detect an amount of electric current applied to the electrically operated actuators.

Where the movable members are moved by the electrically operated actuators such as servomotors, the load acting on the movable members is reflected by the amount of electric current applied to the electrically operated actuators to drive these actuators to move the movable members against the load. Namely, the holding force produced by the electrically operated chuck to hold the object increases with the amount of electric current applied to the electrically operated actuators of the drive devices. Therefore, the holding force by which the object is held by the chuck can be monitored by detecting the amount of electric current applied to the electrically operated actuators.

(4) An electrically operated chucking apparatus according to any one of the above modes (1)–(3), wherein the drive control portion includes a movement detecting portion operable to detect at least one of the actual position and the actual speed of movement of each of the at least two movable members, and drive control portion controls the at least two drive devices on the basis of an output of the movement detecting portion.

To move and stop the movable members or change the speed of movements of the movable members, it is desirable to monitor the position and/or speed of the movable members. The movement detecting portion assures an improved degree of accuracy of control of the movements of the movable members.

(5) An electrically operated chucking apparatus according to any one of the above modes (1)–(4), wherein each of the at least two movable members is provided with a chucking jaw having a gripping surface engageable with an outer surface of a gripping portion of an object to be held by the electrically operated chuck, and the drive control portion includes a provisional positioning control portion operable to control the at least two drive devices, so as to move the at least two movable members toward each other to respective predetermined provisional target positions at which an internal dimension of the electrically operated chuck generally defined by the gripping surfaces of the chucking jaws is smaller by a predetermined amount than an external dimension of the gripping portion of the object.

(6) An electrically operated chucking apparatus according to any one of the above modes (1)–(5), wherein each of the at least two movable member is provided with a chucking jaw engageable with an outer surface of a gripping portion of an object to be held by the electrically operated chuck, and the drive control portion includes an initial positioning portion operable to control the at least two drive devices, so as to move the at least two movable members toward respective predetermined initial positions at which the chucking jaws of all of the at least two movable members are spaced from the outer surface of the gripping portion of the object, by an equal distance, the drive control portion controlling the at least two drive devices to move the at least two movable members from the predetermined initial positions toward the outer surface of the gripping portion of the object.

(7) An electrically operated chucking apparatus according to any one of the above modes (1)–(4), wherein each of the at least two movable members is provided with a chucking jaw having a gripping surface engageable with an inner surface of a gripping portion of an object to be held by the electrically operated chuck, and the drive control portion includes a provisional positioning control portion operable to control the at least two drive devices, so as to move the at least two movable members away from each other to respective predetermined provisional target positions at which an external dimension of the electrically operated chuck generally defined by the gripping surfaces of the chucking jaws is larger by a predetermined amount than an internal dimension of the gripping portion of said object.

(8) An electrically operated chucking apparatus according to any one of the above modes (1)–(4) and (7), wherein each of the at least two movable member is provided with a chucking jaw engageable with an inner surface of a gripping portion of an object to be held by the electrically operated chuck, and the drive control portion includes an initial positioning portion operable to control the at least two drive devices, so as to move the at least two movable members toward respective predetermined initial positions at which the chucking jaws of all of the at least two movable members are spaced from the inner surface of the gripping portion of the object, by an equal distance, the drive control portion controlling the at least two drive devices to move the at least two movable members from the predetermined initial positions toward the inner surface of the gripping portion.

To hold the object, the chucking jaws may be moved toward each other such that their gripping surfaces are brought into engagement with the outer surface of the object, as in the chucking apparatus according to the above mode (5), or may be moved away from each other such that their gripping surfaces are brought into engagement with the inner surface of the object, as in the chucking apparatus according to the above mode (7). When the object is held by the chucking jaws, the chucking jaws are moved toward the gripping portion of the object. For the chucking jaws to provide a holding force acting on the gripping portion, the chucking jaws which are moved toward each other to hold the gripping portion at its outer surface are required to be moved to respective positions at which the internal dimension of the chuck generally defined by the gripping surfaces of the chucking jaws is smaller than the external dimension of the gripping portion. On the other hand, the chucking jaws which are moved away from each other to hold the gripping portion at its inner surface are required to be moved to respective positions at which the external dimension of the chuck generally defined by the gripping surfaces of the chucking jaws is larger than the internal dimension of the gripping portion. Positions of the movable members corresponding to the above-indicated positions of the chucking jaws are referred to as the "provisional target positions", as described above with respect to the above modes (5) and (7). The provisional target positions are determined to enable the electrically operated chuck to provide a sufficiently large holding force.

In the electrically operated chucking device of the present invention, the movable members are movable by the respective drive devices, independently of each other. In other words, the movable members need not be always moved by the same distance, and can be moved by respective different distances. In the above modes (6) and (8), the movable members are initially moved to the respective initial positions at which all of the chucking jaws are spaced by the same distance from the outer or inner surface of the gripping portion of the object at which the object is gripped by the chucking jaws. Where the movable members are moved from the initial positions toward the gripping portion of the object at the same speed, the corresponding chucking jaws come into abutting contact with the gripping portion at the same time. Accordingly, the object can be held by the chucking jaws, with a comparatively high degree of positioning accuracy of the object as held by the chucking jaws, in the electrically operated chucking apparatus constructed according to the above-described mode (6) or (8).

(9) An electrically operated chucking apparatus according to any one of the above modes (1)–(8), wherein each of the at least two movable members is provided with a chucking jaw engageable with a surface of a gripping portion of an object to be held by the electrically operated chuck, and the drive control portion includes a deceleration control portion operable to reduce a speed of movement of each movable member toward the surface of the gripping portion, after the chucking jaw has reached a predetermined deceleration-initiating position at which the chucking jaw is spaced from the surface of the gripping portion by a predetermined distance.

For reducing a shock or impact upon abutting contact of the chucking jaws with the gripping portion of the object, it is desirable to minimize the speed of movement of each movable member toward the gripping portion. In this respect, the chucking apparatus according to the above mode (9) arranged to reduce the speed of movement of each movable member at a position shortly before the surface of the gripping portion is less likely to suffer from damaging of the object, and assures improved positioning accuracy of the object as held by the chucking jaws. The deceleration control portion may be adapted to reduce the movement speed of each movable member in steps, or continuously along a straight line or a curve (e.g., a sine curve).

(10) An electrically operated chucking apparatus according to any one of the above modes (1)–(9), wherein the drive control portion includes a final-target-position holding control portion operable to determine, as final target positions of the at least two movable members, actual positions of the at least two movable members upon detection by the load detecting portion that the load has increased to the predetermined threshold, the final-target-position holding control portion controlling said at least two drive devices to hold the at least two movable members at the final target positions.

(11) An electrically operated chucking apparatus according to the above mode (10), wherein the drive control portion further includes a load-detection inhibiting portion operable to inhibit the detection of the load while the at least two movable members are held at the final target positions under the control of the final-target-position holding control portion.

The object can be held by the chuck with a desired holding force when the movements of the movable members are terminated when the detected load acting on the movable members has increased to the predetermined threshold. However, the object held by the chuck may be displaced relative to the chuck due to some external force exerted onto the object, for instance, due to movements of the movable member an inertial force which may be generated when the chuck is moved with the object. In the electrically operated chucking apparatus according to the above mode (10), the movable members are held at the final target positions which are the actual positions of the movable members when the detected load on the movable members has increased to the predetermined threshold. Accordingly, the object can be held by the chuck with a comparatively high degree of stability in the positioning accuracy of the object. While the movable members are held at the final target positions, it is not necessary to continue the detection of the load by the load on the movable member. In this respect, the detection of the load by the load detecting portion may be inhibited by the load-detection inhibiting portion, as in the above mode (11).

(12) An electrically operated chucking apparatus comprising:

an electrically operated chuck comprising at least two movable members movable toward and away from each other, and at least two drive devices which include respective electrically operated actuators operable to move the at least two movable members, respectively, toward and away from each other; and a control device operable to control the at least two drive devices, and wherein the control device includes a drive control portion operable to control the at least two drive devices such that each of at least one of an actual position and an actual speed of movement of each of the at least two movable members changes toward a predetermined target value, and such that an amount of electric current applied to each of the electrically operated actuators does not exceed a predetermined upper limit.

The electrically operated chuck of the chucking apparatus according to the above mode (12) is controlled in a manner different from that of the electrically operated chuck of the chucking apparatus according to any one of the above modes (1)–(11), which includes load detecting portion operable to detect the load acting on the movable members and a drive control operation arranged to determine whether the detected load has reached a predetermined threshold corresponding to the optimum holding force by which the object is held by the electrically operated chuck. The chucking apparatus according to the above mode (12) does not include such a load detecting portion, but includes a drive control portion arranged to monitor an amount of electric current applied to each electrically operated actuator to move the corresponding movable member. The drive control portion monitors the amount of electric current of each electrically operated actuator, as a parameter representative of the load acting on each movable member. This drive control portion is further arranged to control the drive device such that the amount of electric current does not exceed a predetermined upper limit corresponding to the optimum holding force. Accordingly, the electrically operated chuck does not produce an excessively large holding force, which would be produced if the amount of electric current of the electrically operated actuator exceeded the predetermined upper limit. Thus, the holding force is always optimized irrespective of a variation in the dimension of the gripping portion of the object, permitting even an easily elastically deformable or brittle object to be held by the chuck with a high degree of stability. The drive control portion of the control device of the present chucking apparatus may be considered to have a current limiting function of limiting the amount of electric current applied to the electrically operated actuators. Alternatively, the control device may be considered to include a current limiting portion operable to perform such a current limiting function, as well as the drive control portion. The operation of the drive control portion of the control device will be described in greater detail, with respect to the following specific modes of the present invention. It is to be understood that the foregoing descriptions on the movable members, electrically operated actuators, etc. with respect to the above mode (1) apply to the electrically operated chucking device according to the above mode (12).

(13) An electrically operated chucking apparatus according to the above mode (12), wherein the drive control portion includes a drive-commanding portion operable to generate control commands from time to time, for commanding the at least two drive devices, so as to control at least one of the actual position and the actual speed of movement of each of the at least two movable members.

The drive-commanding portion in the chucking apparatus according to the above mode (13) has the same significance as the drive-commanding portion in the chucking apparatus according to the above mode (2). It is to be understood that the features described above with respect to the above modes (4)–(9) are equally applicable to the chucking apparatus according to the above mode (12) or (13).

(14) An electrically operated chucking apparatus according to the above mode (13), wherein the drive control portion includes a final-target-position holding control portion operable to determine, as final target positions of the at least two movable members, actual positions of the at least two movable members after the amount of electric current applied to each of the electrically operated actuators has been limited to the predetermined upper limit and after a moment of determination by the drive control portion that all of the control commands supplied from the drive-commanding portion have been executed, the final-target-position holding control portion controlling the at least two drive devices to hold the at least two movable members at the final target positions.

Where the drive devices are provided with the control commands that are successively supplied from the drive-commanding portion, even after the movable members come into abutting contact with the gripping portion of the object, the optimum holding force is established after execution of all control commands, since the amount of electric current applied to the electrically operated actuators of the drive devices is limited to the predetermined upper limit which corresponds to the optimum holding force. In the chucking apparatus according to the above mode (14) wherein the movable members are held at the final target positions which are the positions after all of the control commands have executed, the object is not displaced relative to the electrically operated chuck due to any external force exerted onto the object. Thus, the chucking apparatus according to the above mode (14) permits improved stability in the positioning accuracy of the object as held by the electrically operated chuck.

(15) An electrically operated chucking apparatus according to the above mode (14), wherein the final-target-position holding control portion determines, as the final target positions, the actual positions of the at least two movable members when a predetermined time has passed after the amount of electric current applied to each electrically operated actuator has been limited to the predetermined upper limit and after all of the control commands have been executed.

The predetermined time used in the chucking apparatus according to the above mode (15) is determined such that the state in which the object is held by the chuck is stabilized. Accordingly, the movable members are held at the final target positions that are the positions after the holding state of the object is stabilized, that is, after the holding force is stabilized at the optimum value corresponding to the upper limit of the electric current applied to the electrically operated actuators. Thus, the electrically operated chuck of the present chucking device assures a high degree of stability in the holding force.

(16) An electrically operated chucking apparatus according to the above mode (14) or (15), wherein the drive control portion further includes a current limitation canceling portion operable to inhibit limitation of the amount of electric current to the predetermined upper limit while the at least two movable members are held at the final target positions by the final-target-position holding control portion.

The object may be displaced relative to the chuck due to an external force, for example, after the holding of the movable members at the final target positions is initiated. To permit the displaced object to be restored to the final target positions, it is preferable not to limit the drive forces of the electrically operated actuators to move the movable members, that is, not to limit the amounts of electric current applied to the actuators. In the chucking apparatus according to the above mode (16) in which the current limitation to the upper limit is cancelled while the movable members are held at the final target positions, the object can be held by the chuck with a relatively high degree of stability in the positioning accuracy of the object. Where the drive control portion of the control device of the present chucking apparatus has a current limiting function of limiting the amount of electric current applied to the electrically operated actuators, as described above, the current limitation canceling portion inhibits an operation of the drive control portion to perform the current limiting function. Where the control device includes a current limiting portion operable to perform such a current limiting function as well as the drive control portion, the current limitation canceling portion inhibits an operation of the current limiting portion.

(17) An electrically operated chucking apparatus according to any one of the above modes (10) and (14)–(16), wherein the electrically operated chuck is movable to receive an object to be held thereby, from an object-supporting member, and the final-target-position holding control portion determine, as the final target positions, the actual positions of the at least two movable members after the object held by the electrically operated chuck is separated from the object-supporting member.

The electrically operated chuck of the chucking apparatus according to the above mode (17) is arranged to receive and hold the object as supported by the object-supporting member, for instance, to receive the object supported on an object support table, and is then moved with the object away from the object-supporting member. In this chucking apparatus, the object is held by the chuck while the object is supported by the object-supporting member. Therefore, the state in which the object is held by the chuck may be influenced by the object-supporting member. For instance, the object as held by the chuck may be more or less inclined from the nominal position relative to the chuck, due to a force of friction between the object and the object-supporting member. In this case, the influence of the object-supporting member is eliminated immediately after the object is moved with the chuck apart from the object-supporting member, so that the state in which the object is held by the chuck may vary after the object is separated from the object-supporting member, that is, may be brought into its nominal position relative to the chuck. In view of this possibility, the holding of the movable members at the final target positions is desirably initiated after the influence of the object-supporting member on the object is eliminated, that is, after the movable members are separated from the object-supporting member. In this respect, the chucking apparatus according to the above mode (17) is advantageous for its relatively high degree of stability in the positioning accuracy of the object as held by the chuck after the object is separated from the object-supporting member.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF THE PREFERRED EMBODIMENTS

There will be described in detail several embodiments of the electrically operated chucking apparatus of the present invention, which are adapted to be used in an electric-component mounting system, to hold an object in the form of an electric component to be mounted on a printed-wiring board.

Figure 1:
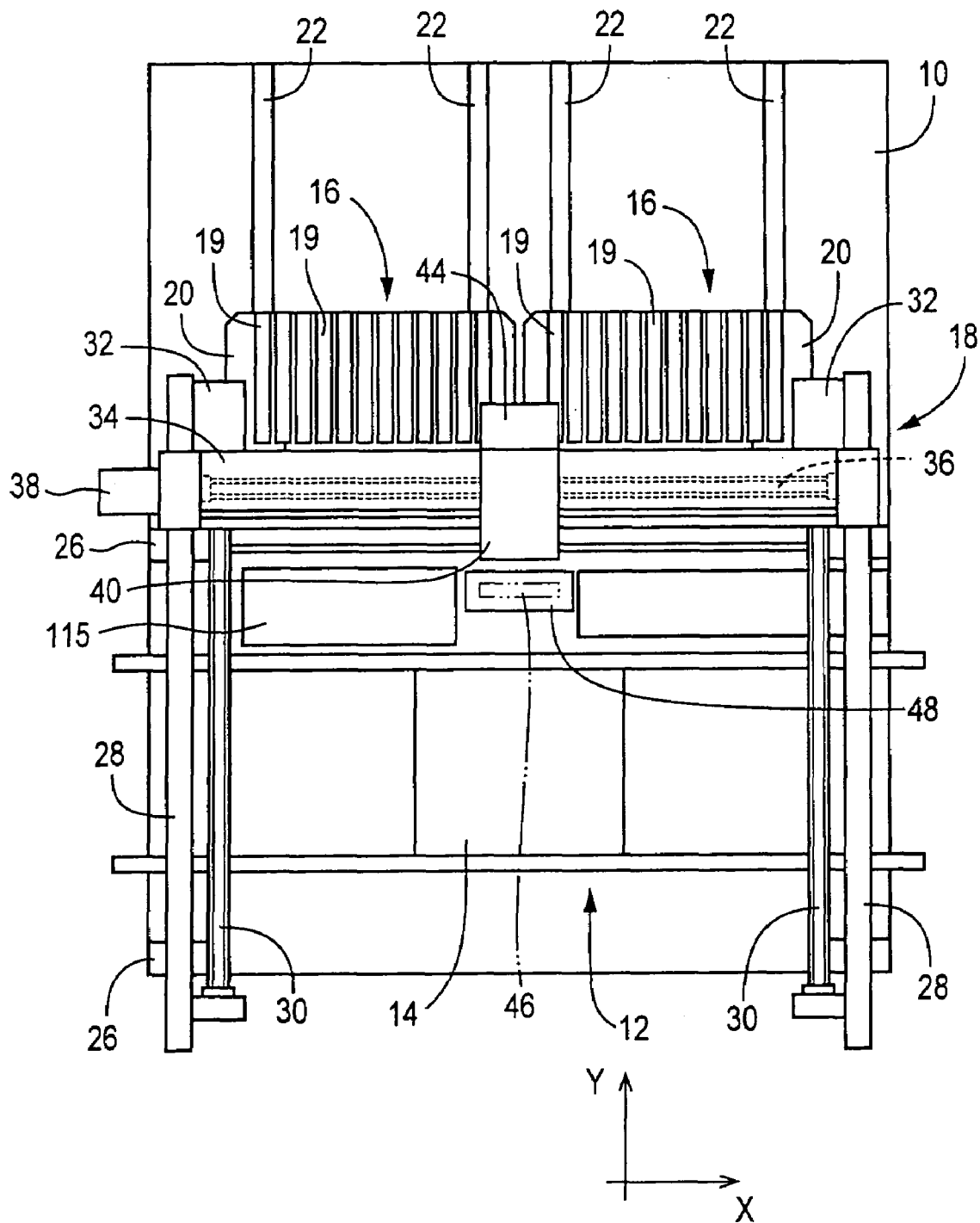
FIG. 1 is a schematic plan view of an electric-component mounting system using an electrically operated chucking apparatus including a liner-motor-driven chuck, which chucking apparatus is constructed according to one embodiment of this invention.

Referring first to the plan view of FIG. 1, the electric-component mounting system has a machine base 10 on which are mounted a substrate conveyor 12, a component-supplying device 16 and a component-mounting device 18. The substrate conveyor 12 is arranged to feed a circuit substrate in the form of the printed-wiring board indicated at 14. The substrate conveyor 12 is further arranged to support and position the printed-wiring board 14 at a predetermined component-mounting position. Thus, the substrate conveyor 14 also functions as a substrate supporting device. The component-supplying device 16 includes two component supply tables 20, and a plurality of object-supporting members in the form of component feeders 19 which are mounted on the component supply tables 20 and each of which accommodates a multiplicity of electric components such that the electric components of different kinds are supplied from the respective component feeders 19. On each of the two component supply tables 20, the component feeders 19 are mounted such that component supply portions of the component feeders 19 are arranged along a straight line parallel to an X-axis direction. Each component supply table 20 is movable on a pair of guides 22, in a Y-axis direction between an operating position or component-supply position of FIG. 1 and a non-operating position or retracted position.

The component-mounting device 18 has an XY positioning device, which includes a Y-axis slide 34 movable in the Y-axis direction perpendicular to the X-axis direction, and an X-axis slide 40 movable in the X-axis direction. The Y-axis slide 34 is slidably mounted on a pair of guides 28 which are supported by supported posts 26 fixedly provided on the machine base 10 and which extend in the Y-axis direction. The Y-axis slide 34 is moved in the Y-axis direction by a Y-axis drive motor (servomotor) 32 through a pair of feedscrews 30 extending parallel to the guides 28. The X-axis slide 40 is mounted on the Y-axis slide 34 such that the X-axis slide 40 is movable in the X-axis direction by an X-axis drive motor (servomotor) 38 through a feedscew 36. The X-axis slide 40 carries a component-mounting head 44, which is arranged to receive each electric component supplied from the component-supplying device 16. The X-axis slide 40 and the Y-axis slide 34 are moved to move the component-mounting head 44, for mounting the electric component at a predetermined component-mounting spot on the printed-wiring board 14. An image-taking device 48 incorporating a line sensor 46 is fixedly disposed on the machine base 10, to take an image of the electric component as held by the component-mounting head 44, during a movement of the head 44 from the component-receiving position to a position right above the component-mounting spot corresponding to the electric component.

Figure 2:
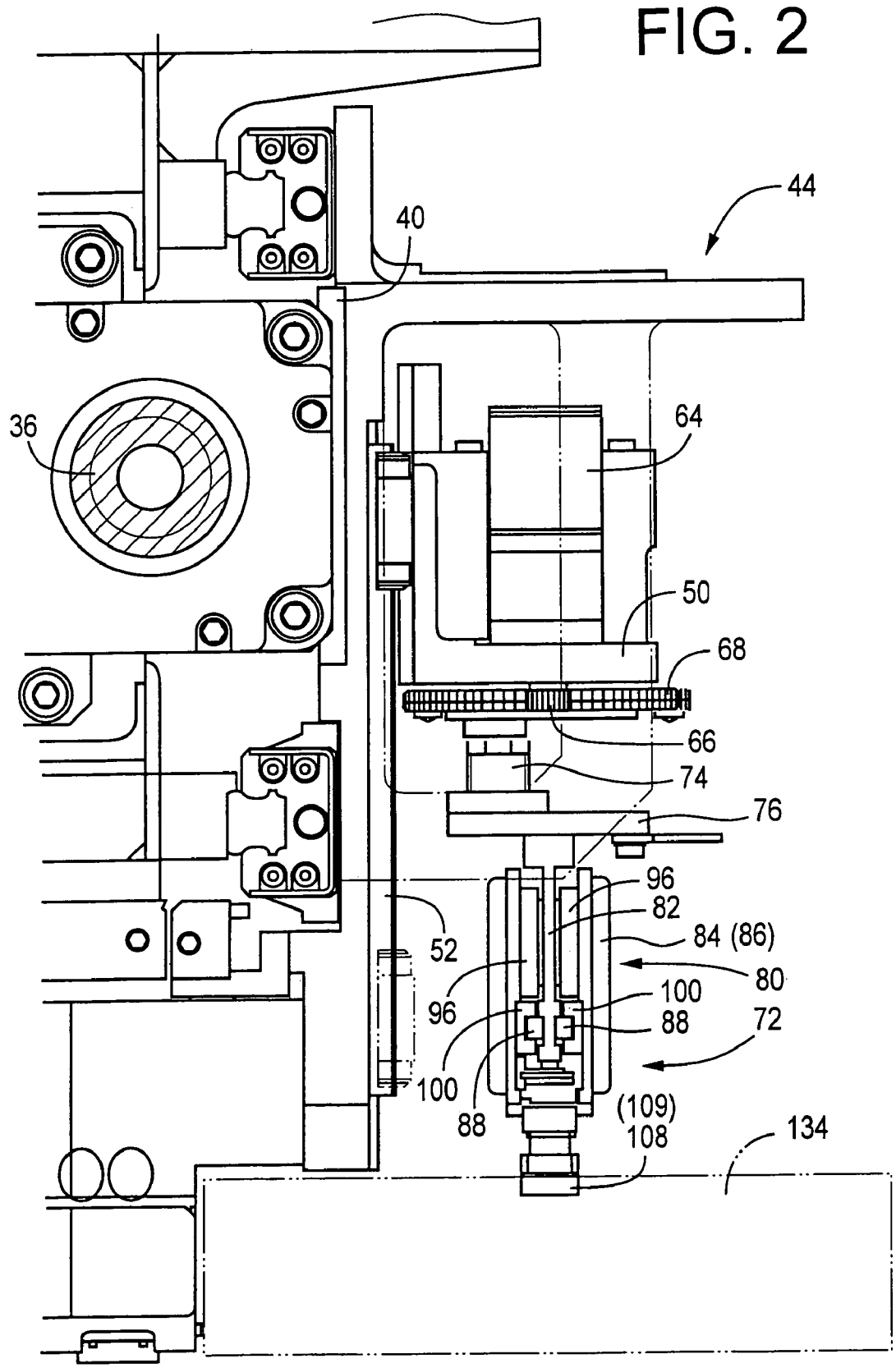
FIG. 2 is a side elevational view showing a vicinity of the linear-motor-driven chuck in the electric-component mounting system of FIG. 1.
Figure 3:
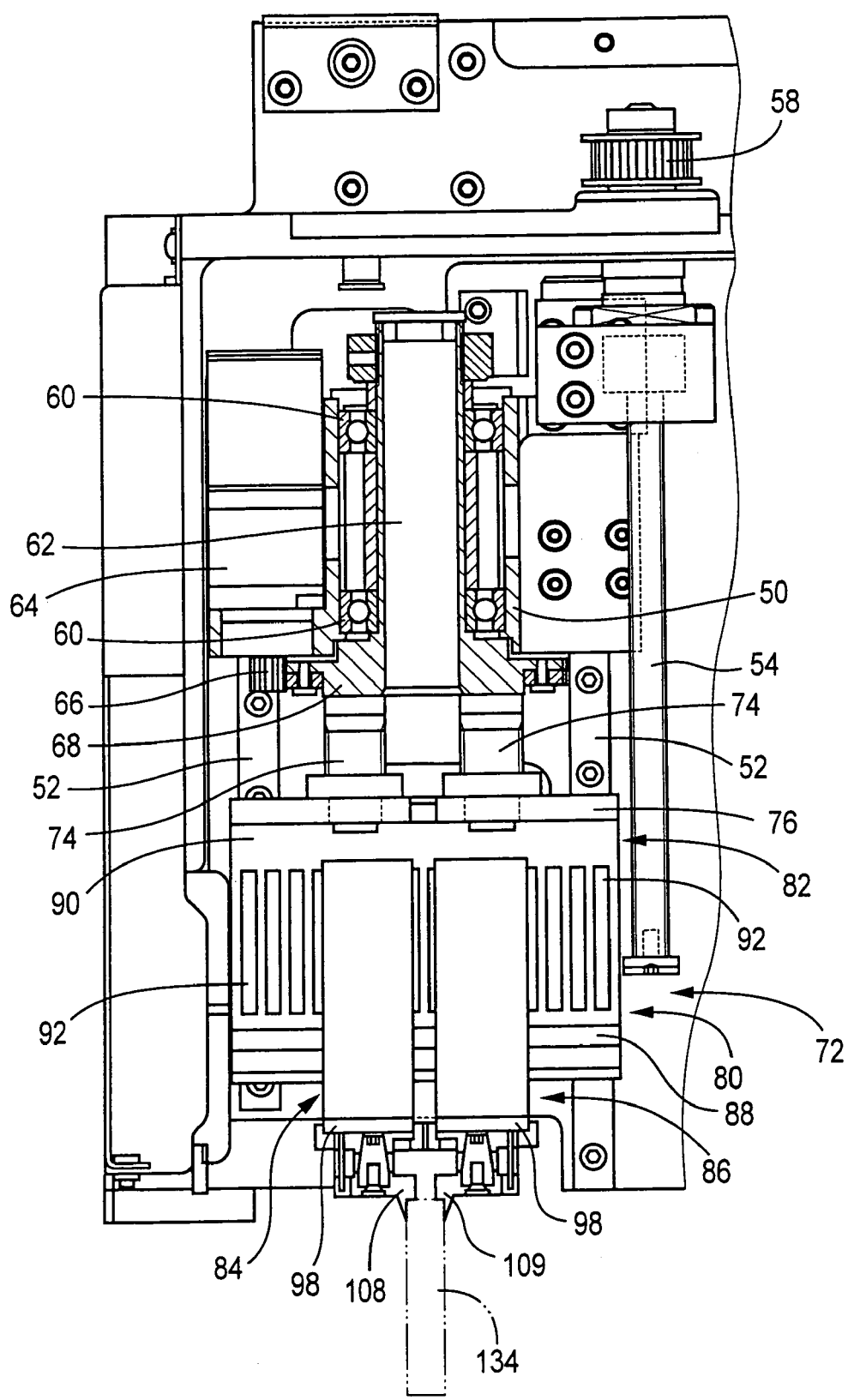
FIG. 3 is a front elevational view showing the vicinity of the linear-motor-driven chuck.

As shown in FIGS. 2 and 3, the component-mounting head 44 includes a main body in the form of a vertically movable member 50 which is movable on the X-axis slide 40 in a vertical or Z-axis direction perpendicular to the XY plane. This vertically movable member 50 is slidably mounted on a pair of guides 52 provided on the X-axis slide 40, and is moved by a Z-axis drive motor (servomotor) 56 through a feedscrew 54. A rotary motion of the Z-axis drive motor 56 (shown in FIG. 8) is transmitted to the feedscrew 54 through a transmission including a timing pulley 58. A rotary shaft 62 is mounted on the vertically movable member 50 through a pair of bearings 60 such that the rotary shaft 62 extends in the Z-axis direction and is rotatable but axially immovable relative to the vertically movable member 50. The rotary shaft 50 is rotated by a θ-axis drive motor (servomotor) 64 through a pinion 66 and a gear 68.

Figure 4:
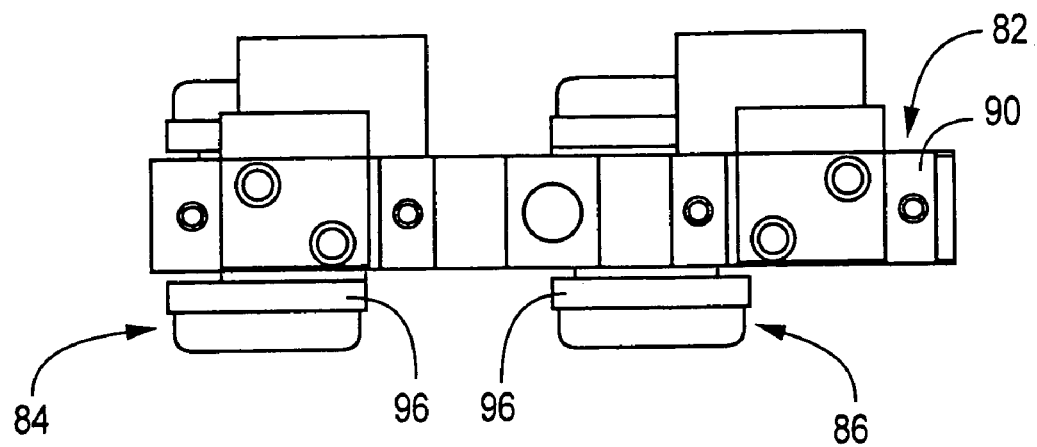
FIG. 4 is a plan view of the linear-motor-driven chuck.
Figure 5:
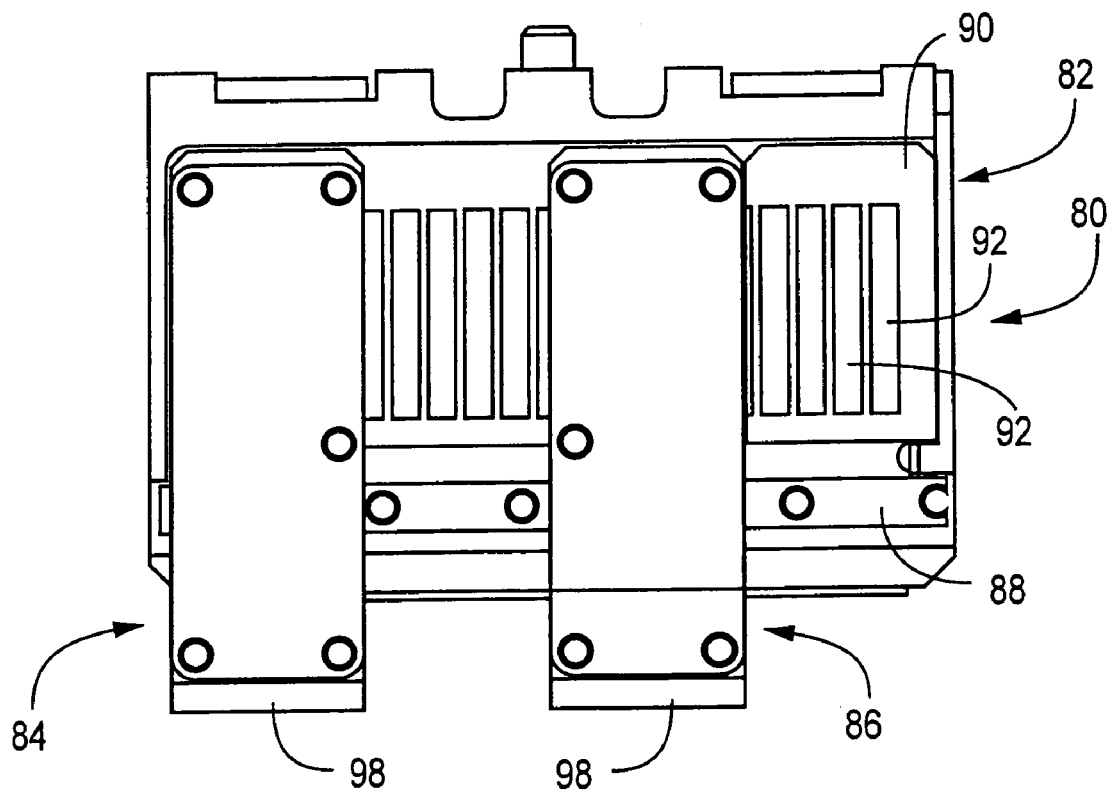
FIG. 5 is a front elevational view of the linear-motor-driven chuck.
Figure 6:
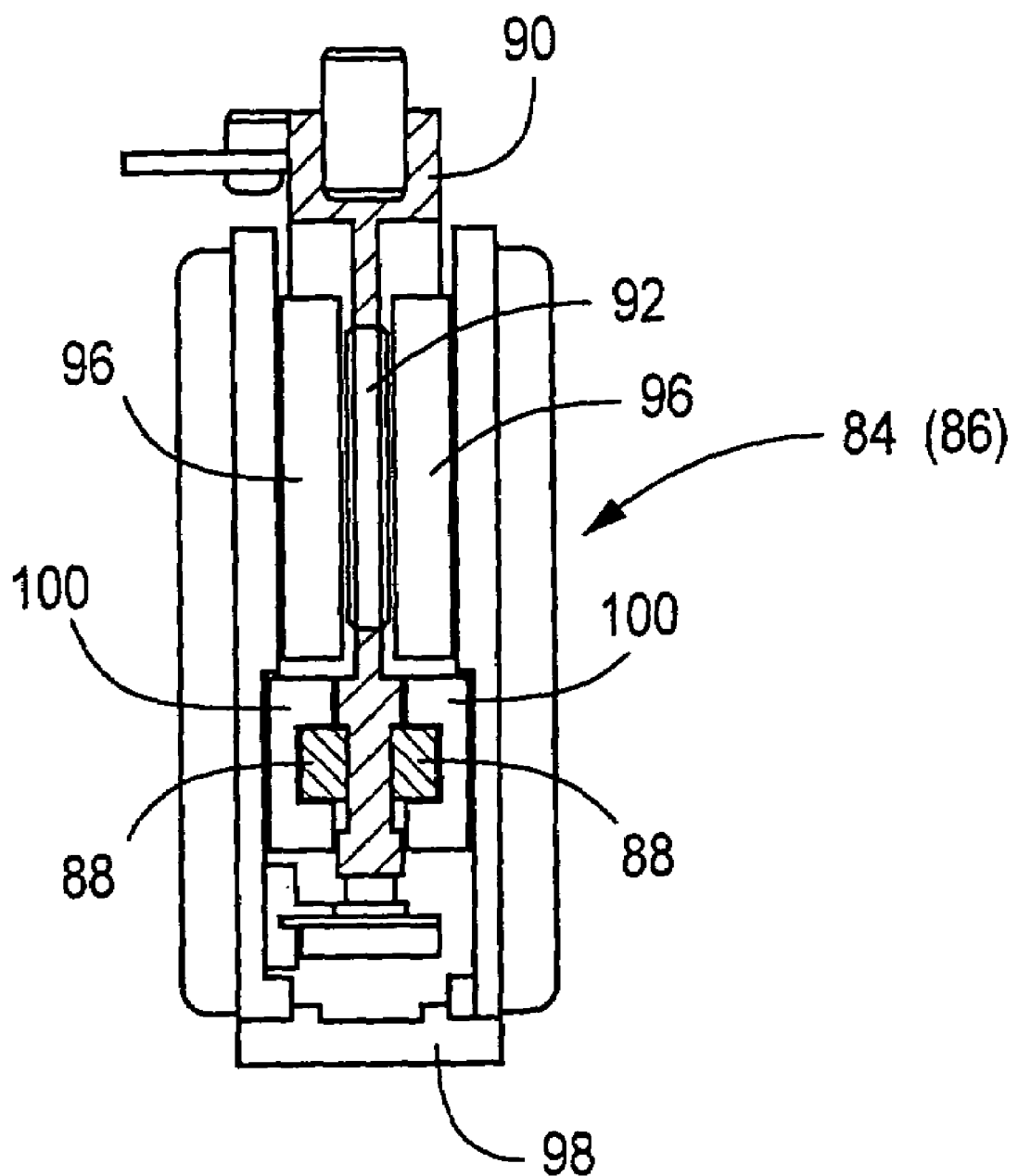
FIG. 6 is a side elevational view in cross section of the linear-motor-driven chuck.

A body portion of the gear 68 is formed integrally with the lower end portion of the rotary shaft 62. To the body portion of the gear 68, there is removably attached a linear-motor-driven chuck 72 (hereinafter referred to simply as "chuck 72") of the electrically operated chucking apparatus constructed according to the present embodiment. Described more specifically, a mounting member 76 is fixed to the lower end face of the body portion of the gear 68 through a pair of connecting rods 74. The chuck 72 includes an electrically operated actuator in the form of a linear motor 80 having a stator 82, and is removably attached at the stator 82 to the mounting member 76. The linear motor 80 is a linear DC brushless motor, which includes the above-indicated stator 82, a pair of armatures in the form of a pair of movable elements 84, 86, and a pair of guides 88 for guiding the movable elements 84, 86 in the longitudinal direction of the stator 82. The chuck 72 is shown in the plan view of FIG. 4 and the front elevational view of FIG. 5.

The stator 82 has a main body 90 formed of a non-magnetic material, more precisely, an aluminum alloy, and a multiplicity of permanent magnets 92 fixedly embedded in the main body 90. Each permanent magnet 92 is a prismatic member having a rectangular cross sectional shape and two opposite surfaces parallel to the front and rear surfaces of the main body 90. The two opposite surfaces of each permanent magnet 92 are polarized as N and S poles, respectively. The permanent magnets 92 are positioned on the main body 90 such that the N-pole surface and the S-pole surface of each permanent magnet 92 are spaced from the front and rear surfaces of the main body 92 by a small distance in the direction of thickness of the main body 92, and such that the permanent magnets 92 are spaced apart from each other in the longitudinal direction of the stator 82 while the N-pole and S-pole surfaces are arranged alternately in the longitudinal direction of the stator 82 on each of the front and rear surfaces of the main body 90.

Each of the two movable elements 84, 86 is provided with two iron cores 96 which are opposed to the respective opposite front and rear surfaces of the stator 82 and which are connected at their lower ends to each other by a table 98, such that the two iron cores 96 and the table 98 cooperate to constitute a generally U-shaped structure. Each iron core 96 is provided with a U-phase coil winding, a V-phase coil winding and a W-phase coil winding, which cooperate to form a coil unit. By controlling an armature current to be applied to the coil units of the two iron cores 96, a linearly moving force produced by an interaction between magnetic forces generated by the coil windings and magnetic forces of the permanent magnets 92 of the stator 82 is controlled when the movable element 84, 86 is linearly moved by the linearly moving force along the stator 82.

The movements of the movable elements 84, 86 are guided by the two guides 88 fixed to the respective front and rear surfaces of the stator 82. The generally U-shaped structure of each movable element 84, 86 has two sliders 100 fixed to respective inner surfaces thereof opposed to the front and rear surfaces of the stator 82. These sliders 100 are held in engagement with the respective guides 88 via balls, so that the movable elements 84, 86 are slidably movable on the guides 88. In the present embodiment, the electrically operated actuator in the form of the linear motor 80 constitutes a main body portion of the electrically operated chuck in the form of the linear-motor-driven chuck 72, and the two movable elements 84, 86 function as a pair of movable members. The linear motor 80 operable to move the movable elements 84, 86 may be considered to function as a pair of electrically operated actuators for moving the pair of movable members. The linear motor 80 may also be considered to function as a drive device for driving the movable members, and the stator 82 may be considered to constitute a main body of the chuck 72, which functions to hold the movable members and the electrically operated actuator.

The two movable elements 84, 86 have respective zero points at the longitudinal opposite ends of the stator 82. These zero points are detected by respective zero-point detectors 102, 103 (shown in FIG. 8), and the positions of the movable elements 84, 86 are detected by respective position detectors 104, 106 (also shown in FIG. 8). The positions of the movable elements 84, 86 are represented by their distances from their zero points. In the present embodiment, each of the zero-point detectors 102, 103 is a photoelectric sensor of light emitting type including a light emitting element (LED) serving as a light emitter, and a photo-detector whose output changes depending upon whether a light emitted by the light emitter is received or not. Each movable element 84, 86 carries a shutter member, and the light emitter and the photo-detector are positioned such that the shutter is interposed between the light emitter and the photo-detector when the movable element 84, 86 has reached its zero point. However, the zero-point detectors 102, 103 may be any other type of sensor or detector such as a photoelectric sensor of light reflecting type, a limit switch or other contact-type detector, and a proximity switch. On the other hand, each of the position detectors 104, 106 is a magnetic type linear scale (so-called "magnescale") including a magnetic detector head carried by each movable element 84, 86, and a magnetic scale which is magnetically calibrated and read by the magnetic detector head. A distance of displacement of each movable element 84, 86 is detected on the basis of an electric signal generated by the magnetic detector head. However, the position detectors 104, 106 may be any other type of sensor or detector, such as an optical type linear scale. A single magnetic scale may be used commonly for the two position detectors 104, 106.

Figure 7A:
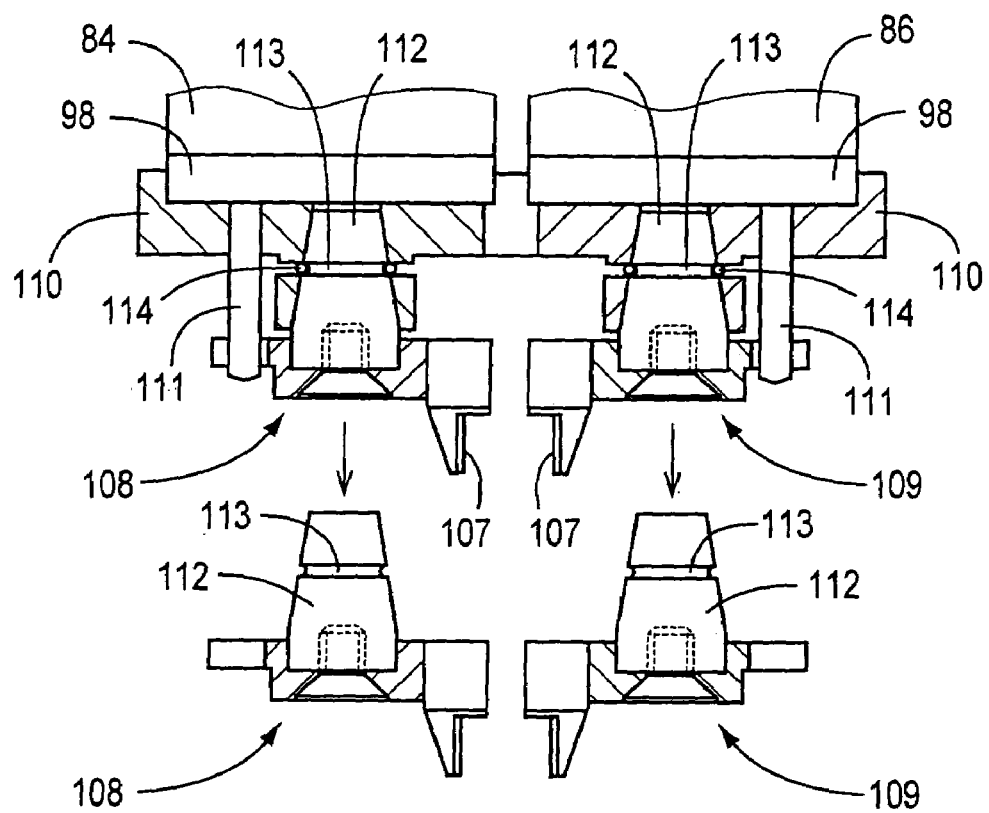
FIGS. 7A and 7B are views for explaining installation and removal of chucking jaws of the linear-motor-driven chuck.
Figure 7B:
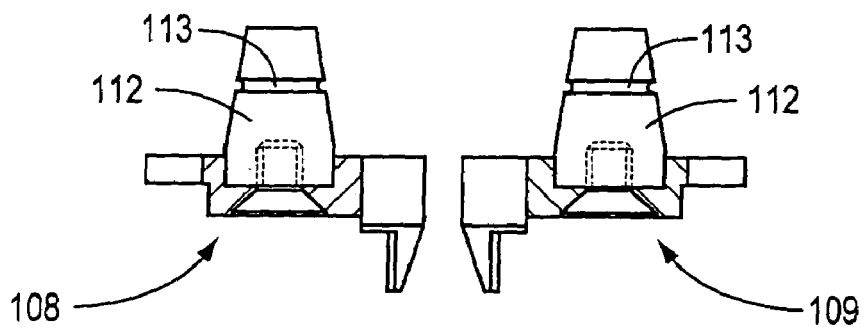

Two chucking jaws 108, 109 which cooperate to function as chucking members for holding the electric component are removably attached to the respective tables 98 of the two movable elements 84, 86. A plurality of sets of chucking jaws 108, 109 of different configurations (different sizes and shapes) are prepared for respective different kinds of electric components to be held by the chuck 72. Namely, the chucking jaws 108, 109 are changed depending upon the specific kind of the electric component to be chucked. The table 98 of each movable element 84, 86 has a jaw holder 110 and a positioning pin 111 fixed thereto, while each chucking jaw 108, 109 has a tapered shank 112, as shown in enlargement in FIG. 7A. The tapered shank 112 has an annular engaging groove 113 formed in its outer circumferential surface. The jaw holder 110 has a tapered hole formed therein, and a U-shaped retainer 114 fixed thereto. The U-shaped retainer 114 is an elastic member having a pair of opposed parallel arms. When the tapered shank 112 is fitted into the tapered hole in the jaw holder 110, the pair of arms of the U-shaped retainer 114 are elastically brought into engagement with the annular engaging groove 113, to thereby prevent the chucking jaw 108, 109 from being removed from the jaw holder 110. Further, the free end portion of the positioning pin 111 is inserted into a positioning hole formed in each chucking jaw 108, 109, so that the chucking jaw 108, 109 is positioned in its circumferential direction of the tapered shank 112 relative to the jaw holder 110 and is prevented from being rotated. While the chucking jaws 108, 109 serving as the gripper are removably attached to the movable elements 84, 86 serving as the movable members, the gripper may be formed integrally with each movable element 84, 86. The chucking jaws 108, 109 shown in FIG. 7A are formed to hold the electric component, in contact with the outer surface of the electric component, while the chucking jaws 108, 109 shown in FIG. 7B are formed to hold the electric component, in contact with the inner surface of the electric component.

Each chucking jaw 108, 109 has a gripper portion provided with an elastic member in the form of a rubber plate 107, which has a gripping surface engageable with the outer surface of a gripping portion of the electric component at which the electric component is held by the chucking jaws 108, 109. The rubber plate 107 functions as a shock absorber or damper when the gripper portion is brought into abutting contact with the electric component, i.e., an object to be chucked. The rubber plate 107 also functions as a friction member for giving a suitable amount of friction force between the gripper portion and the object. As described below in detail, the object holding force to be produced by the present electrically operated chuck 72 (linear-motor-driven chuck) can be electrically controlled, so that the spring constant of the rubber lining 107 need not be made as low as required in the prior art, that is, may be made comparatively high by using a comparatively hard rubber material and forming the rubber lining 107 with a comparatively small thickness. In the electric-component mounting system described above wherein the component-mounting head 44 holding the electric component is moved in the X-axis and Y-axis directions, the movable elements 84, 86 may be subject to an inertial force, which may reduce the holding force for holding the electric component. However, the resiliency of the rubber linings 107 effectively prevents an excessive amount of reduction of the holding force due to the inertial force. In this respect, the rubber linings 107 also function as a member to prevent reduction of the holding force.

The set of chucking jaws 108, 109 is automatically changed depending upon the specific kind of the electric component to be held by the chuck 72. To this end, the sets of chucking jaws 108, 109 are accommodated in a jaw accommodating device 115 disposed between the component-supplying device 16 and the substrate conveyor 12, as shown in FIG. 1. When the set of chucking jaws 108, 109 presently mounted on the movable elements 84, 86 is replaced by another set of chucking jaws 108, 109, the chuck 72 is moved to a position right above the jaw accommodating device 115, and is lowered until the jaws 108, 109 are brought into engagement with a jaw detaching member which is provided within the jaw accommodating device 115 and which is operable to remove the jaws 108, 109 from the chuck 72 when the chuck 72 is elevated away from the jaw accommodating device 115. The removed jaws 108, 109 is accommodated within the jaw accommodating device 115. The new set of chucking jaws 108, 109 is attached to the movable elements 84, 86 by a downward of the chuck 72. Since the understanding of the manner of changing the chucking jaws 108, 109 is not essential to understand the principle of this invention, no detailed description in this respect is deemed necessary. Briefly described, the chucking jaws 108, 109 can be easily attached and removed to and from the jaw holders 110 of the chuck 72 by applying a suitable amount of force to the tapered shanks 112 in the axial direction.

Figure 8:
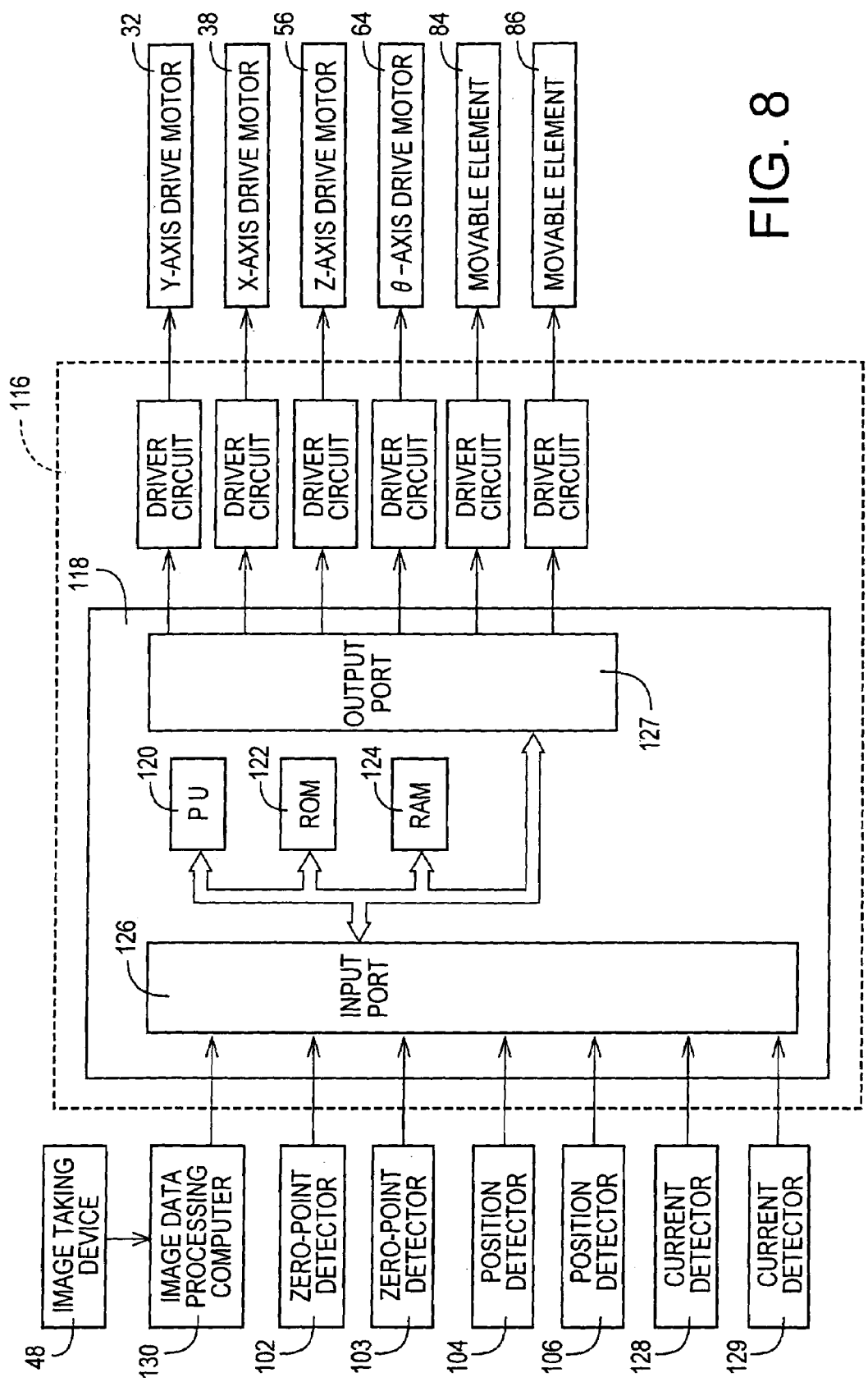
FIG. 8 is a block diagram showing a portion of a control device of the electric-component mounting system, which portion relates to the present invention.

The electric-component mounting is controlled by a control device 116. FIG. 8 shows only those elements of the control device 116 which relate to the present invention. The control device 116 is constituted principally by a computer 118 which incorporates a processing unit (PU) 120, a read-only memory (ROM) 122, a random-access memory (RAM) 124, an input port 126, and an output port 127, which are interconnected to each other by a bus line. To the input port 126, there are connected an image data processing computer 130 operable to process image data obtained by the image taking device 48, the zero-point detectors 102, 103, the position detectors 104, 106, and two current detectors 128, 129 provided to detect amounts of electric currents applied to the movable elements 84, 86 of the linear motor 80. The current detectors 128, 129 also function as load detectors for detecting loads acting on the movable elements 84, 86. To the output port 127, there are connected through driver circuits the Y-axis drive motor 32, the X-axis drive motor 38, the Z-axis drive motor 56, the θ-axis drive motor 64 and the movable elements 84, 86. The ROM 122 stores various control programs such as a program for executing a printed-wiring-board assembling routine illustrated in the flow charts of FIGS. 9–11, for controlling the electric-component mounting system to automatically mounts the electric components on the printed-wiring board 14, so as to fabricate a printed-circuit board. The printed-wiring-board assembling routine will be described, assuming that the chucking jaws 108, 109 of the type shown in FIG. 7A are used.

Figure 9:
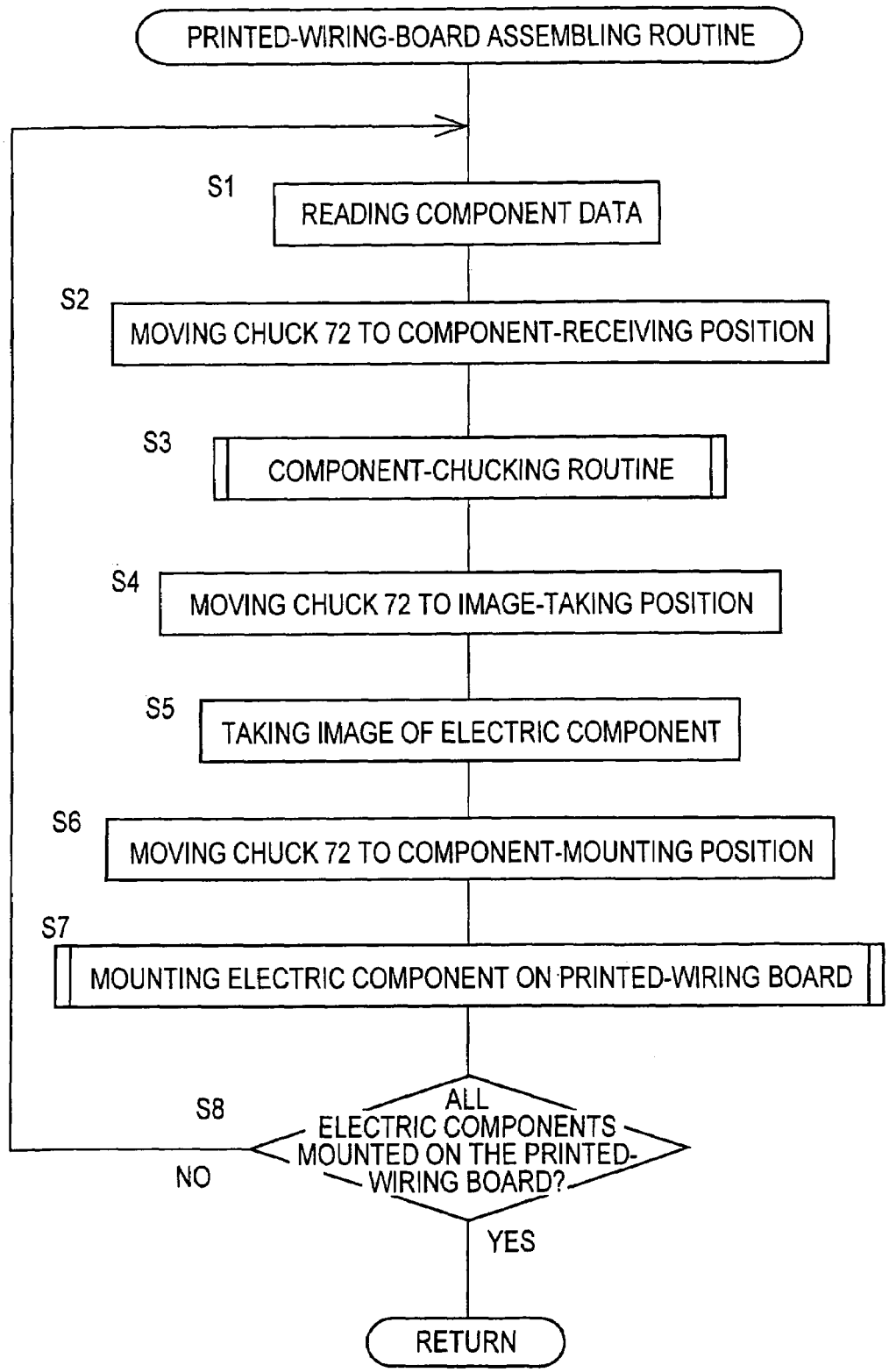
FIG. 9 is a flow chart illustrating a printed-wiring board assembling routine executed by the control device according to a control program.

When the printed-wiring board 14 has been positioned at the component-mounting position by the substrate conveyor 12, the routine of FIG. 9 is initiated with step S1 to read out component data relating to the electric component to be mounted next on the board 14. The component data include component-kind data indicative of the kind of the next electric component, receiving-position data indicative of the predetermined component-receiving position at which the next electric component is received by the chuck 72, and mounting-spot data indicative of the predetermined component-mounting spot on the board 14 at which the next electric component is to be mounted. Step S1 is followed by step S2 in which the chuck 72 is moved, according to the component data, to the component-receiving position at which the chuck 72 receives the electric component. Then, the control flow goes to step S3 in which a component chucking routine is initiated.

Figure 10:
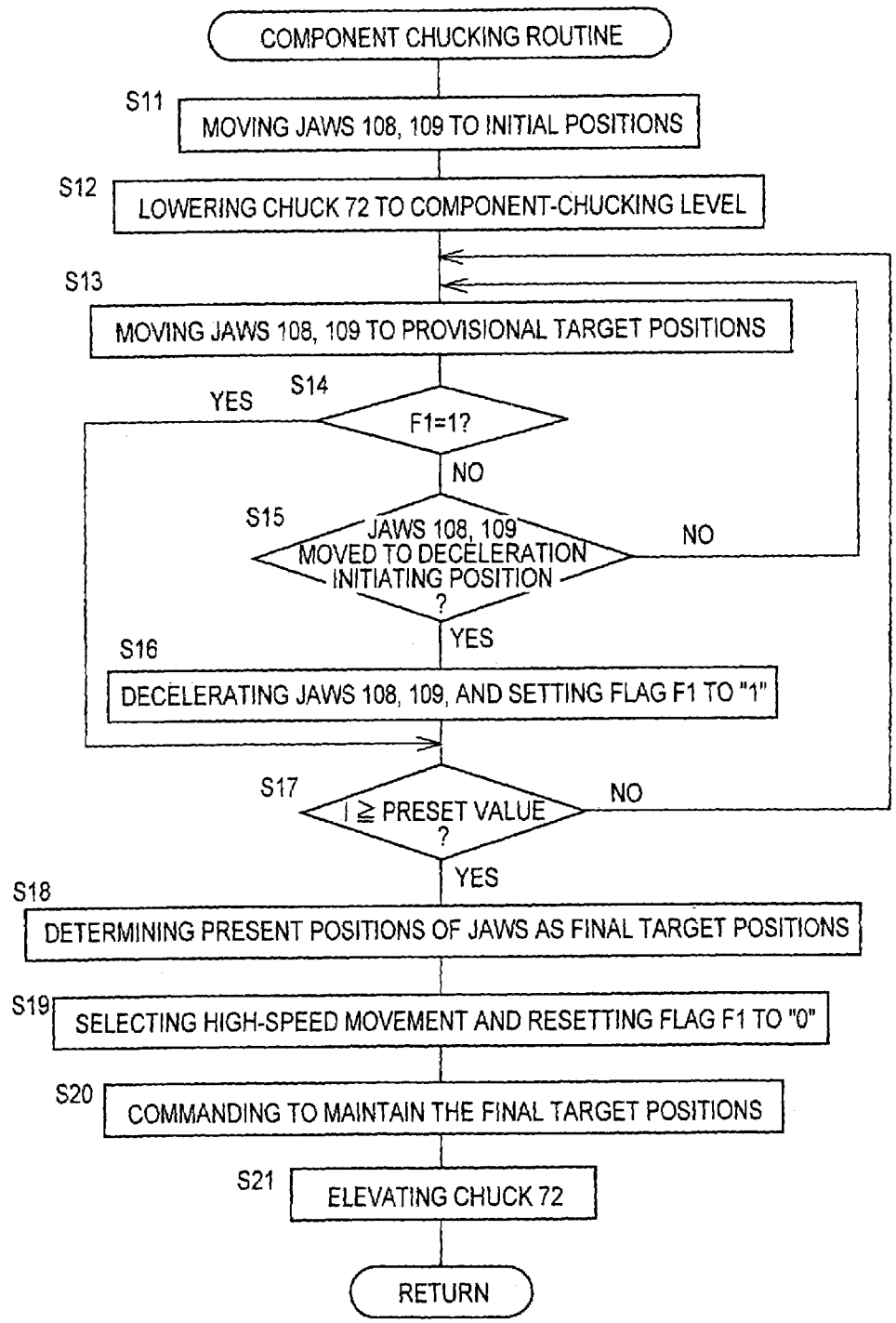
FIG. 10 is a flow chart illustrating a component chucking routine executed in step S3 of the routine of FIG. 9.
Figure 11:
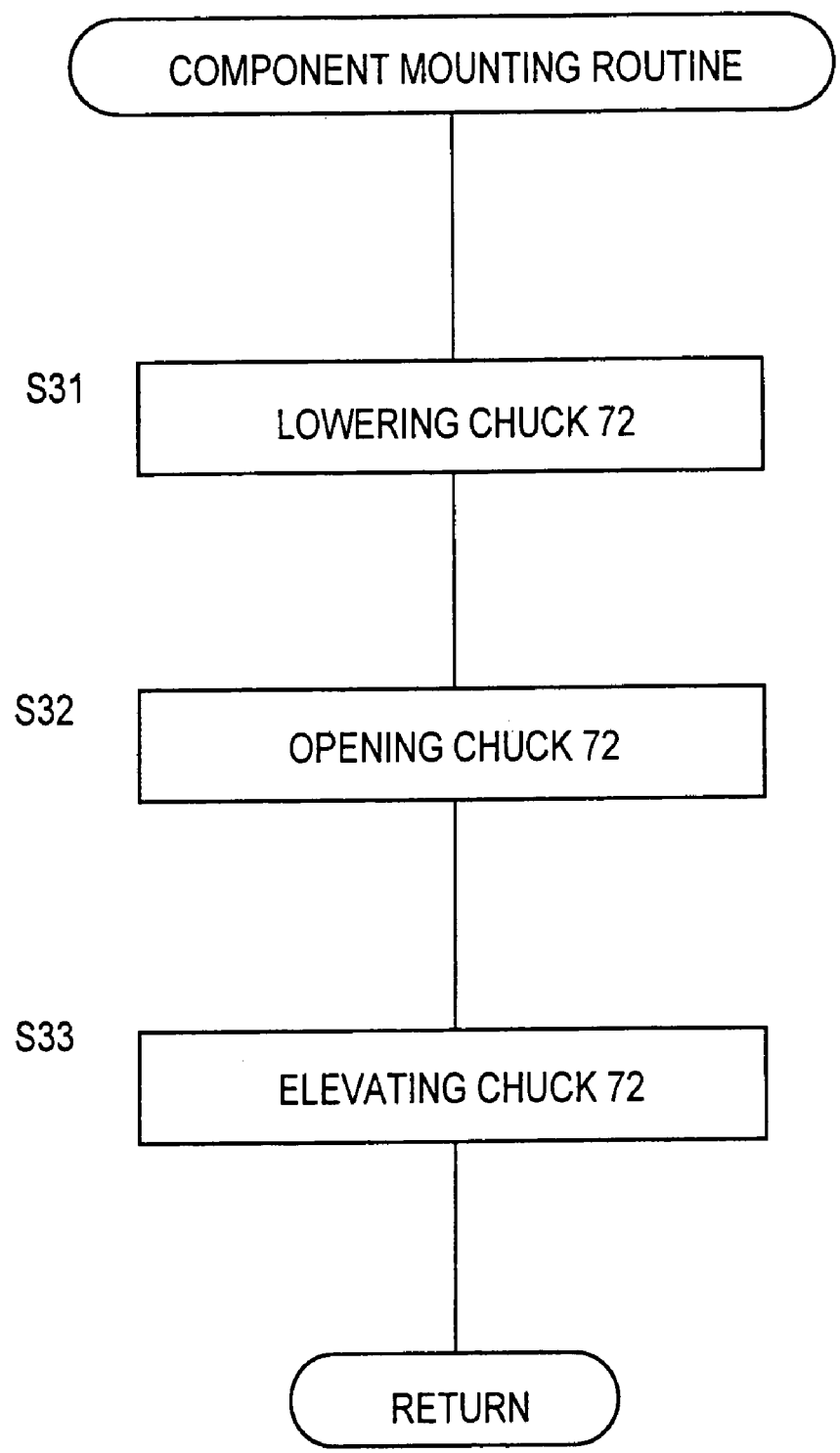
FIG. 11 is a flow chart illustrating a component mounting routine executed in step S7 of the routine of FIG. 9.

The component chucking routine, which is illustrated in the flow chart of FIG. 10, is initiated with step S11 in which the chucking jaws 108, 109 are moved to predetermined initial positions at which the chuck 72 is in an open state. Described in detail, the initial positions of the chucking jaws 108, 109 are determined such that the surfaces of the two rubber linings 107 of the jaws 108, 109 located at the initial positions are theoretically spaced from a predetermined same distance from the respective outer surfaces of the electric component with which the rubber linings 107 come into abutting contact, to hold the electric component located at the component-receiving position. The initial position of each chucking jaw 108, 109 is determined for each of the different kinds of the electric components, and is represented by an initial-position distance from a reference position of the gripping portion of the electric component at which the electric component is to be held by the chucking jaws 108, 109. Distance data sets indicative of the different initial-position distances for the different kinds of the electric components are stored in the RAM 124, and one of the distance data sets which corresponds to the specific kind of the electric component to be chucked is read out from the RAM 124, according to the component-kind data, for each of the chucking jaws 108, 109 (for each of the movable elements 84, 86). The moving elements 84, 86 are moved according to the read-out distance data set, so that the chucking jaws 108, 109 are moved to the initial positions. It will be understood that a portion of the control device 116 assigned to implement step S11 constitutes an initial positioning portion operable to move the chucking jaws 108, 109 to the predetermined initial positions. It is noted that the chucking jaws 108, 109 are moved to the initial positions in the X-axis direction. That is, the movements of the chucking jaws 108, 109 to the initial positions are effected while the chuck 72 is positioned in the rotating direction of the rotary shaft 62, so as to be placed in an angular position at which the chucking jaws 108, 109 are moved in the X-axis direction.

The above-indicated reference position of the gripping portion of the electric component is aligned with the centerline of the chuck 72, that is, the axis of rotation of the rotary shaft 62 when the chuck 72 is attached to the mounting member 76. Accordingly, the chucking jaws 108, 109 are moved by the same distance to their initial positions, symmetrically with respect to a plane including the axis of rotation of the rotary shaft 62, where the electric component is symmetric with respect to a plane perpendicular to the direction of movements of the two chucking jaws 108, 109 toward and away from each other. Where the electric component is asymmetric with respect to the above plane, the chucking maws 108, 109 are moved by different distances to their initial positions, asymmetrically with respect to the plane including the axis of rotation of the rotary shaft 62. It will be understood that the portion of the control device 116 assigned to implement step S11 of the component chucking routine of FIG. 10 constitutes an object-adaptive control portion operable to control the chuck 72 such that the chuck 72 is opened to its initial position, in a manner adapted to the kind or configuration of the electric component. Namely, the object-adaptive control portion is considered to include a symmetric control portion operable to open the chuck 72 to its initial position, with symmetric movements of the chucking jaws 108, 109 when the electric component has a symmetric configuration, and an asymmetric control portion operable to open the chuck to its initial position, with asymmetric movements of the chucking jaws 108, 109 when the electric component has an asymmetric configuration.

After the chucking jaws 108, 109 have been moved to their initial positions the control flow goes to step S12 in which the vertically movable member 50 is lowered by the Z-axis drive motor 56 to lower the chuck 72 to a level at which the chuck 72 holds the electric component indicated at 134 in FIG. 3. Then, the control flow goes to step S13 in which the movable elements 84, 86 are driven according to positioning commands to move the chucking jaws 108, 109 to hold the electric component 134. At this time, the positions of the chucking jaws 108, 109 are continuously detected by the position detectors 104, 106, while the amounts of electric current I applied to the movable elements 84, 86 of the linear motor 80 are continuously detected by the current detectors 128, 129. It will be understood that the position detectors 104, 106 and a portion of the control device 116 assigned to detect the positions of the chucking jaws 108, 109 on the basis of the output signals of the position detectors 104, 106 cooperate to constitute a movement detecting portion operable to detect the positions of the chucking jaws 108, 109. It will also be understood that the current detectors 104, 106 and a portion of the control device 116 assigned to detect the amount of electric current I on the basis of the output signals of the current detectors 104, 106 cooperate to constitute a current detecting portion operable to detect the amounts of electric current I applied to the movable elements 84, 86, and a load detecting portion operable to detect a load acting on the chucking jaws 108, 109.

In step S13, the movable elements 84, 86 are controlled to move the chucking jaws 108, 109 from the initial positions toward the outer surfaces of the electric component to be held by the chuck 72. Described in detail, the chucking jaws 108, 109 are moved to predetermined provisional target positions at which a distance between the chucking jaws 108, 109 is smaller by a predetermined small amount than an external dimension of the gripping portion of the electric component. This predetermined small amount is determined so as to absorb or accommodate an expected maximum amount of variation of the external dimension of the gripping portion of the electric component. The movable elements 84, 86 are commanded to be moved to the predetermined provisional target positions according to positioning commands generated by suitable drivers. It will be understood that a portion of the control device 116 assigned to implement step S13 constitutes a drive-commanding portion operable to command the movable elements 84, 86 to move the chucking jaws 108, 109 to the provisional target positions, and a provisional positioning control portion operable to effect provisional positioning of the chucking jaws 108, 109.

Step S13 is followed by step S14 to determine whether a DECELERATION flag F1 (which will be described) is set at "1". When step S13 is implemented for the first time, that is, immediately after the movements of the chucking jaws 108, 109 toward the provisional target positions is initiated, a negative decision (NO) is obtained in step S14, and the control flow goes to step S15 to determine whether the chucking jaws 108, 109 have reached a predetermined deceleration-initiating position at which the speed of the movements of the chucking jaws 108, 109 is reduced. The deceleration-initiating position is spaced apart from the outer surfaces of the gripping portion of the electric component by a predetermined distance in directions toward the initial positions. The deceleration-initiating position is changed depending upon the specific kind of the electric component, and deceleration-initiating data sets indicative of the different deceleration-initiating positions for the different kinds of electric components are stored in the RAM 124. The deceleration-initiating position for each kind of electric component is determined while taking into account the expected maximum amount of variation in the external dimension of the gripping portion of the electric component. When an affirmative decision (YES) is obtained in step S15, the control flow goes to step S16 to decelerate the chucking jaws 108, 109, so that the chucking jaws 108, 109 are brought into abutting contact with the gripping portion, with a reduced amount of shock or impact. In the present embodiment, the chucking jaws 108, 109 are moved at a relatively high speed until the affirmative decision is obtained in step S15, and at a relatively low speed after the affirmative decision is obtained in step S15. Namely, the speed of movements of the chucking jaws 108, 109 is reduced in step S16. The movements at the relatively high speed are achieved by generation of positioning commands at a relatively high frequency, while the movements at the relatively low speed are achieved by generation of the positioning commands at a relatively low frequency. In step S16, the above-indicated DECELERATION flag F1 is set to "1", so that when step S14 is implemented in the subsequent control cycles, an affirmative decision (YES) is obtained in step S14, and the control flow goes to step S17, while skipping steps S15 and S16. It will be understood that a portion of the control device 116 assigned to implement steps S15 and S16 constitutes a deceleration control portion operable to decelerate the chucking jaws 108, 109 when the jaws have reached the predetermined deceleration-initiating position.

Further movements of the chucking jaws 108, 109 after their abutting contact with the outer surfaces of the gripping portion of the electric components will cause an increase in a load acting on each chucking jaw 108, 109, and an increase in a load acting on each movable element 84, 86. The loads acting on the movable elements 84, 86 are monitored by the above-indicated current detecting portion or load detecting portion, on the basis of the detected amounts of electric current I applied thereto. The movements of the chucking jaws 108, 109 toward the provisional target positions are terminated when the amounts of electric current I have increased to or exceeded a preset threshold value. To this end, step S17 is implemented to determine whether the detected amounts of electric current I have reached or exceeded the threshold value. If an affirmative decision (YES) is obtained in step S17, the generation of the movements commands is terminated to stop the chucking jaws 108, 109, so that the electric component can be held or gripped by the chucking jaws 108, 109 with a suitably controlled holding force.

Then, the control flow goes to step S18 in which the present positions of the chucking jaws 108, 109 are determined as final target positions. Step S18 is followed by step S19 in which the command to move the chucking jaws 108, 109 at the relatively low speed is replaced by the command to move them at the relatively high speed, so that the chucking jaws 108, 109 are moved at the relatively high speed when step S13 is subsequently implemented for the next electric component. Further, the DECELERATION flag F1 is reset to "0", in step S19. Then, the control flow goes to step S20 in which the linear motor 80 is commanded to maintain the chucking jaws 108, 109 at the final target positions. It will be understood that a portion of the control device 116 assigned to implement steps S18 and S20 constitutes a final-target-position holding control portion operable to maintain the chucking jaws 108, 109 at the final target positions. While the chucking jaws 108, 109 are held at the final target positions, the detection of the loads acting on the movable elements 84, 86 is not effected. In this respect, the above-indicated portion of the control device 116 also functions as a load-detection inhibiting portion operable to inhibit the detection of the loads while the chucking jaws 108, 109 are held at the final target positions. With a series of steps S11–S20 being implemented, the electric component is held by the chucking jaws 108, 109 of the chuck 72 with an optimum amount of holding force. In this state, the chuck 72 is elevated in step S21. In summary, the control device 116 functions as a drive control portion operable to control the movable elements 84, 86 for controlling the movements of the chucking jaws 108, 109. The drive control portion includes the above-indicated drive-commanding portion, movement detecting portion, provisional positioning control portion, initial positioning portion, deceleration control portion, final-target-position holding portion, and load detecting portion, etc.

In FIG. 3, the electric component 134 having the smallest width dimension that can be held by the chuck 72 is shown by two-dot chain line. The chucking jaws 108, 109 can be spaced apart from each other by a maximum distance which is several times the smallest width dimension of the electric component. That is, the chuck 72 can hold the electric component whose width dimension is several times the smallest width dimension. The horizontal dimension of the electric component 134 indicated by two-dot chain line in FIG. 2 is the maximum dimension in the Y-axis direction perpendicular to the X-axis direction in which the chucking jaws 108, 109 are moved when the electric component is held by the chuck 72. Further, the chuck 72 can hold the electric component whose dimension in the Z-axis direction is considerably large, since the maximum distance of movements of the vertically movable member 50 and the chuck 72 is sufficiently large.

As described above, the movable elements 84, 86 are controlled independently of each other to control the movements of the two chucking jaws 108, 109 independently of each other. Although the component chucking routine of FIG. 10 has been described in the case of the chucking jaws 108, 109 of the type shown in FIG. 7A arranged to hold the electric component at its outer surfaces, the movements of the chucking jaws 108, 109 of the type shown in FIG. 7B arranged to hold the electric component at its inner surfaces are controlled in substantially the same manner as described above, except for the directions of the movements to the initial positions and the provisional target positions.

After the chuck 72 has received the electric component 134 from the component-supplying device 16, in step S3 of the routine of FIG. 9, the control flow goes to step S4 in which the chuck 72 is moved to a predetermined image-taking position. Step S4 is followed by step S5 in which an image of the electric component 134 is taken by the image taking device 48 which is provided with the line sensor 46. Described more specifically, a movement of the chuck 72 at a predetermined constant speed by a predetermined distance in the Y-axis direction is initiated, to permit the line sensor 64 to take multiple lines of images which collectively define a two-dimensional image of the electric component 134. However, the image taking device 48 provided with the line sensor 46 may be replaced by an image taking device using a matrix of CCDs capable of taking a two-dimensional image of an object at one time. Image data obtained by the image taking device 48 are compared with reference image data indicative of an image of the electric component which has nominal center positions in the XY coordinate system and a nominal angular position about a vertical axis which passes the center of the electric component. This comparison of the image data is effected by the image data processing computer 130, to obtain hold-position error data of the electric component, that is, to calculate center position errors $\Delta X$ and $\Delta Y$ and an angular positioning error $\Delta \theta$ of the electric component 234. The calculated center position errors $\Delta X$ and $\Delta Y$ and angular positioning error $\Delta \theta$ are fed from the computer 130 to the computer 118 of the control device 116.

Step S5 is followed by step S6 in which the chuck 72 is moved to the predetermined component-mounting position obtained in step S1, while at the same time the hold position error data of the electric component obtained in step S5 are supplied from the image data processing computer 130 to the computer 118. The chuck 72 is rotated to eliminate the angular positioning error $\Delta \theta$ of the electric component, and movement data to move the chuck 72 in the X-axis and Y-axis directions to the component-mounting position are adjusted to eliminate the center position errors $\Delta X$ and $\Delta Y$ of the electric component. Then, the control flow goes to step S7 in which the electric component is mounted at the component-mounting spot on the printed-wiring board 14, according to a component mounting routine illustrated in the flow chart of FIG. 11. Namely, the component mounting routine is initiated with step S31 in which the chuck 72 is lowered to force the electric component 134 onto the component-mounting surface of the printed-wiring board 14, so that the electric component 134 is temporarily fixed to the component-mounting surface with an adhesive agent already applied to the component-mounting spot. Step S31 is followed by step S32 in which the chuck 72 is opened to release the electric component 134. Then, the control flow goes to step S33 in which the chuck 72 is elevated away from the printed-wiring board 14.

When the electric component has been mounted at the predetermined component-mounting spot on the printed-wiring board 14, the control flow goes to step S8 to determine whether the intended component mounting operation to mount all of the electric components on the board 14 is completed. If a negative decision (NO) is obtained in step S8, the control flow goes back to step S1 to repeatedly execute the printed-wiring-board assembling routine of FIG. 9. If an affirmative decision (YES) is obtained, the execution of the routine of FIG. 9 for the present board 14 is terminated.

Figure 12:
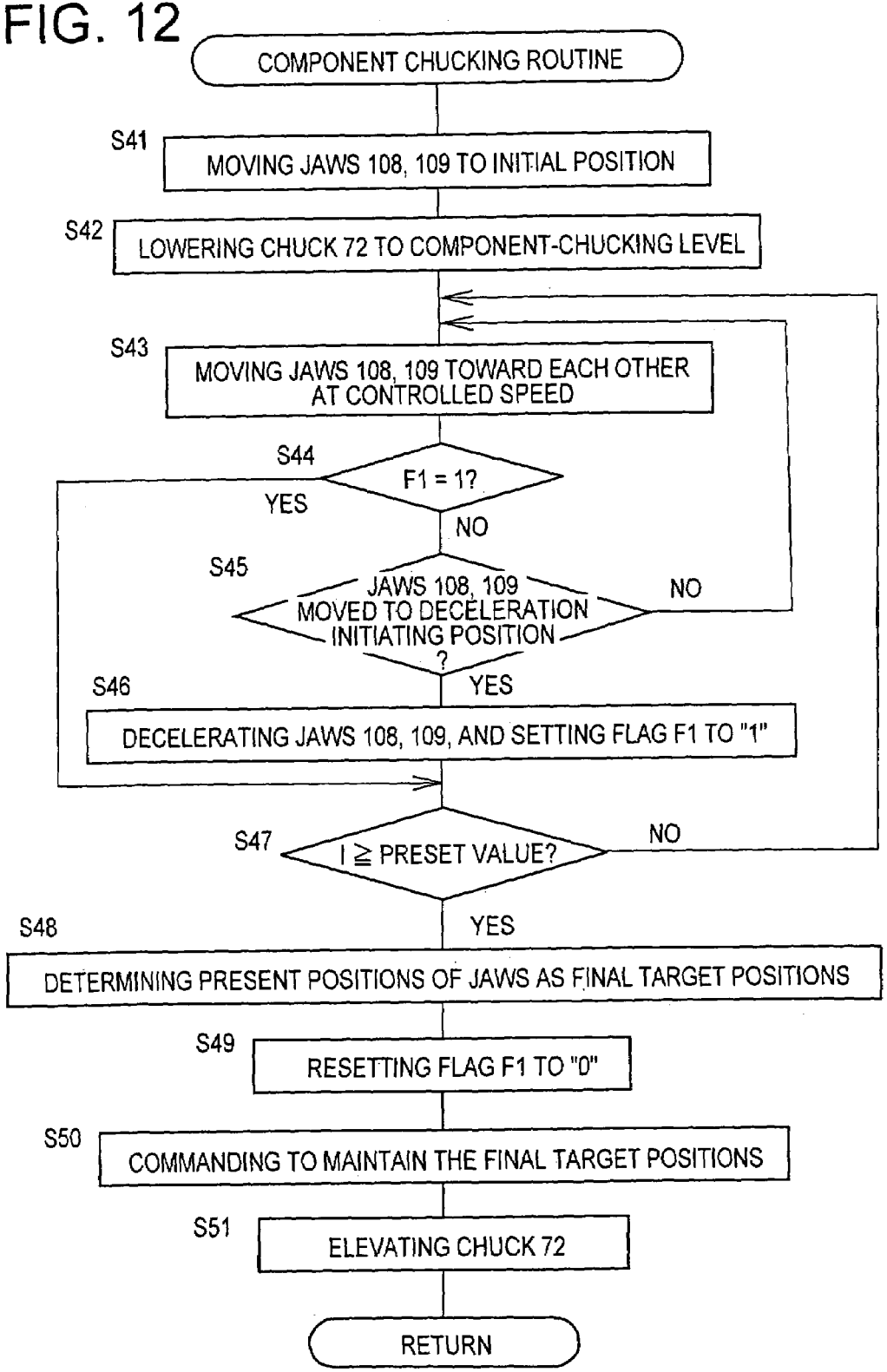
FIG. 12 is a flow chart illustrating a component chucking routine executed in place of the routine of FIG. 10, in another embodiment of this invention.

There will be described a component chucking routine which is executed by the control device 116 according to a second embodiment of this invention in place of the component chucking routine of FIG. 10. Unlike the first embodiment of FIG. 10 wherein the movements of the chucking jaws 108, 109 are controlled by positioning commands, the present second embodiment is arranged to control the movements by speed control commands. The component chucking routine of FIG. 12 is initiated with step S41 to move the chucking jaws 108, 109 to the provisional target positions at which the jaws 108, 109 are spaced apart from the outer surfaces of the electric component by the same distance, as described above with respect to step S11. After the chuck 72 is lowered in step S42, the control flow goes to step S43 in which movements of the chucking jaws 108, 109 towards each other at a controlled speed are initiated, so that the two chucking jaws 108, 108 eventually come into abutting contact with the electric component at the same time. Steps S44 and S45 are identical with steps S14 and S15. If an affirmative decision (YES) is obtained in step S45, step S46 is implemented to decelerate the chucking jaws 108, 109, as in step S16, so that the chucking jaws 108, 109 come into abutting contact with the electric component at a reduced speed, with a reduced shock.

Steps S47–S51 are identical with steps S17–S21, except in that step S49 is formulated to merely reset the DECELERATION flag F1 to "0". Like step S17, step S47 assures an optimum holding force by which the electric component is held by the chucking jaws 108, 109 whose movements have been controlled by the speed control commands.

There will next be described a component chucking routine according to a third embodiment of this invention, by reference to the flow chart of FIG. 13. Unlike the first and second embodiments of FIGS. 10 and 12 in which the movements of the chucking jaws 108, 109 are stopped when the monitored or detected amounts of electric current I applied to the movable elements 84, 86 have increased to the predetermined threshold value, the present third embodiment is arranged to move the chucking jaws 108, 109 toward the provisional target positions according to positioning commands such that the amounts of electric current I to be applied to the movable elements 84, 86 are limited so as not to exceed a predetermined upper limit. The movable elements 84, 86 are driven with the limited electric current I, to move the chucking jaws 108, 109 until all of the positioning commands have been executed. Steps S60 and S61 that are identical with steps S11 and S12 are followed by step S62 in which drive current limitation of the movable elements 84, 86 is initiated. Step S62 is followed by step S63 in which the movable elements 84, 86 are driven according to positioning commands to move the chucking jaws 108, 109 to the predetermined provisional target positions, as in step S13, but under the drive current limitation of the movable elements 84, 86. Thus, the loads acting on the movable elements 4, 86 will not exceed an upper limit corresponding to the upper limit of the amounts of electric current I to be applied to the movable elements 84, 86, while the movable elements 84, 86 are driven according to the positioning commands to move the chucking jaws 108, 109 toward the provisional target positions. Accordingly, the movements of the chucking jaws 108, 109 toward each other are substantially inhibited after the loads on the movable member 84, 86 have reached the upper limit, so that the holding force of the chuck 72 is maintained at the optimum value corresponding to the upper limit. Step S63 is followed by step S64 to determine whether all of the positioning commands have been executed. When an affirmative decision (YES) is obtained in step S64, the control flow goes to step S65 to maintain the present operating state of the chuck 72 for a predetermined time, for permitting the holding force and position of the electric component to be stabilized. Then, step S66 is implemented to determine the present positions of the chucking jaws 108, 109 as the final target positions, as in step S18. Step S66 is followed by step S67 to cancel the drive current limitation of the movable elements 84, 86. Then, steps S68 and S69 identical with steps S20 and S21 are implemented. The drive current limitation is cancelled in step S67, to assure a high response of the movable elements 84, 86 when they are required to be operated to move the chucking jaws 108, 109 when the chucking jaws 108, 109 are displaced from the final target positions for some reason or other during the control to maintain the final target positions in step S68.

There will be described a component chucking routine according to a fourth embodiment of the present invention, by reference to the flow chart of FIG. 14. The component chucking routine of FIG. 14 is similar to that of FIG. 13 in that the movable elements 84, 86 are driven under the drive current limitation, but is different from the routine of FIG. 13 in that the movable elements 84, 86 are driven according to the speed control commands rather than the positioning commands, as in the embodiment of FIG. 12. The routine of FIG. 14 is initiated with steps S70–S72 identical with steps S60–S62 of FIG. 13. Steps S70–S72 are followed by step S73 in which the speed control commands are generated to move the chucking jaws 108, 109 at a controlled speed. Then, the control flow goes to steps S74–S79 identical with steps S64–S69 of FIG. 13. Like the component chucking routine of FIG. 13, the component chucking routine of FIG. 14 assures an optimum holding force of the chuck 72 owing to the drive current limitation of the movable elements 84, 86. It will be understood that a portion of the control device 116 assigned to implement steps S67 and S77 of FIGS. 13 and 14 constitutes a current limitation canceling portion operable to cancel the limitation of the drive current I to be applied to the movable elements 84, 86.

Referring next to the flow chart of FIG. 15, there will be described a component chucking routine according to a fifth embodiment of this invention, which is identical with that of the third embodiment of FIG. 13, except in that the chuck 72 is elevated before the final target positions of the chucking jaws 108, 109 are determined to maintain the chucking jaws 108, 109 at the determined final target positions. In the preceding embodiments of FIGS. 10–14, the chuck 72 is elevated while the chucking jaws 108, 109 are held at the determined final target positions. FIGS. 16A and 16B schematically show a problem which may take place if the chuck 72 is elevated while the chucking jaws 108, 109 are held at the final target positions determined before the elevation of the chuck 72. Under some condition, the electric component 134 may be held by the chucking jaws 108, 109 while the electric component 134 is forced against a surface 135 of the component-supplying device 16, as indicated in FIG. 16A. In this case, a friction force due to a load acting on a portion "A" of the electric component 134 in the X-axis direction, or any other external force other than the component holding force generated by the chuck 72 acts on the electric component 134. If the chucking jaws 108, 109 are held at the final target positions of the chucking jaws 108, 109 determined under the drive current limitation of the movable elements 84, 86, the electric component 134 is freed from an influence of the friction force or any other external force after the elevation of the chuck 72 away from the surface 135, so that the component holding force acting on the electric component 134 is reduced, leading to a possibility of falling of the electric component 134 from the chuck 72.

Under some other conditions, the electric component 134 may be held by the chucking jaws 108, 109 with some angle of inclination of the electric component relative to the chucking jaws 108, 109, which causes gaps between the jaws and the outer surfaces of the electric component, as indicated in FIG. 16B. In this case, too, there is a possibility of falling of the electric component 134 from the chuck 72 due to reduced component holding force if the chuck 72 is elevated while the chucking jaws 108, 109 are held at the final target positions of the chucking jaws 108, 109 determined under the drive current limitation of the movable elements 84, 86.

Figure 13:
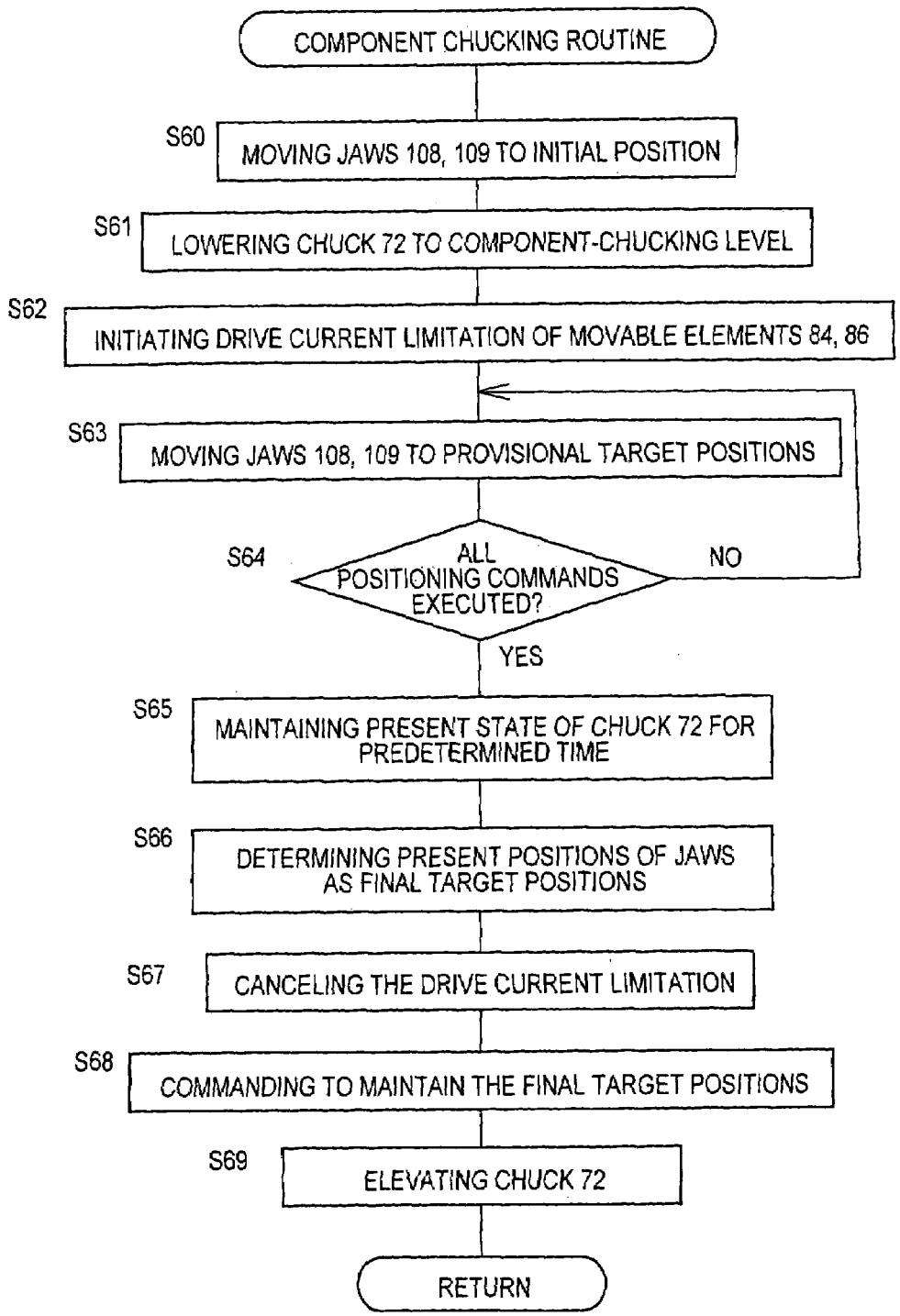
FIG. 13 is a flow chart illustrating a component chucking routine executed in a further embodiment of this invention.
Figure 14:
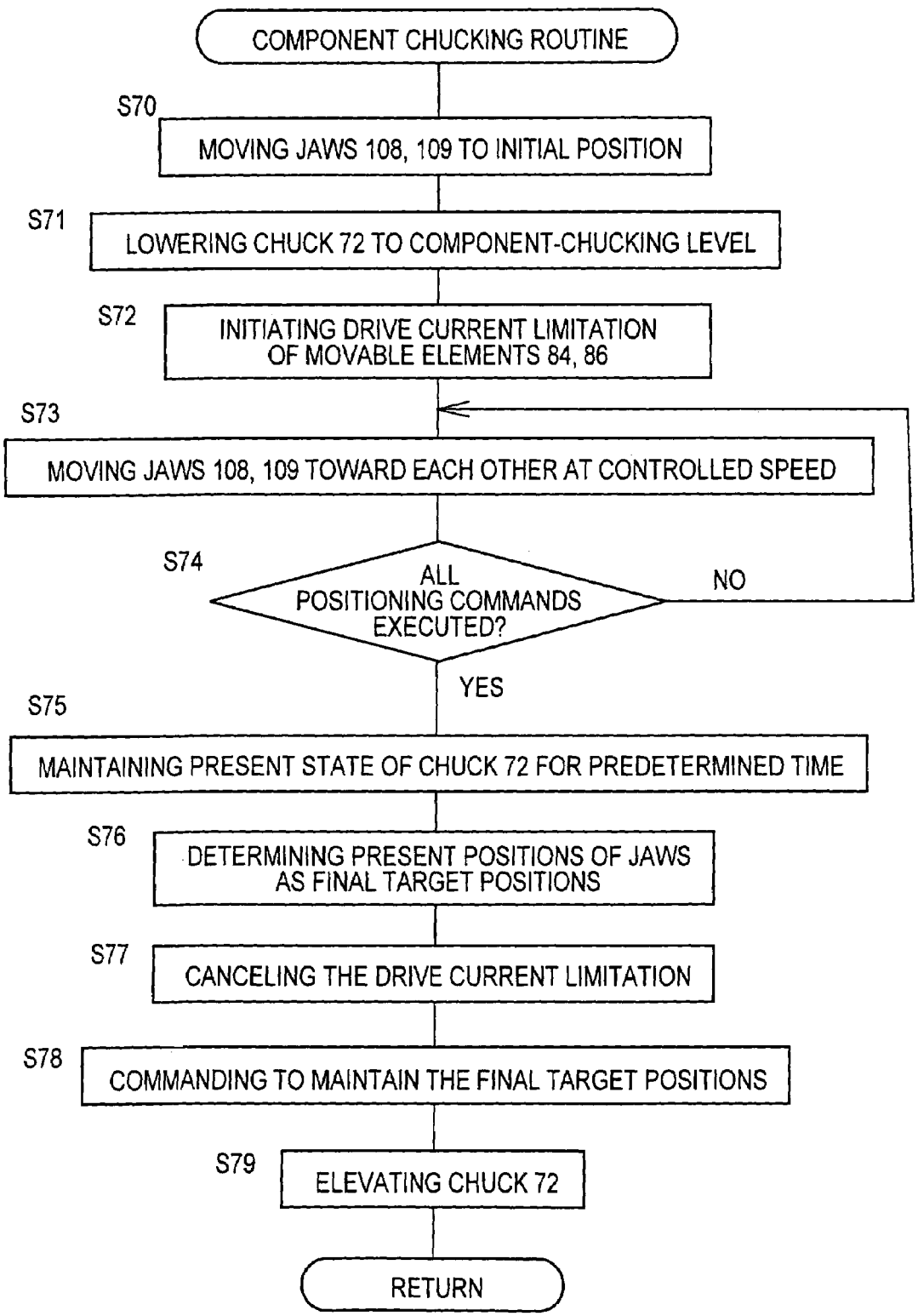
FIG. 14 is a flow chart illustrating a component chucking routine executed in a still further embodiment of this invention.
Figure 15:
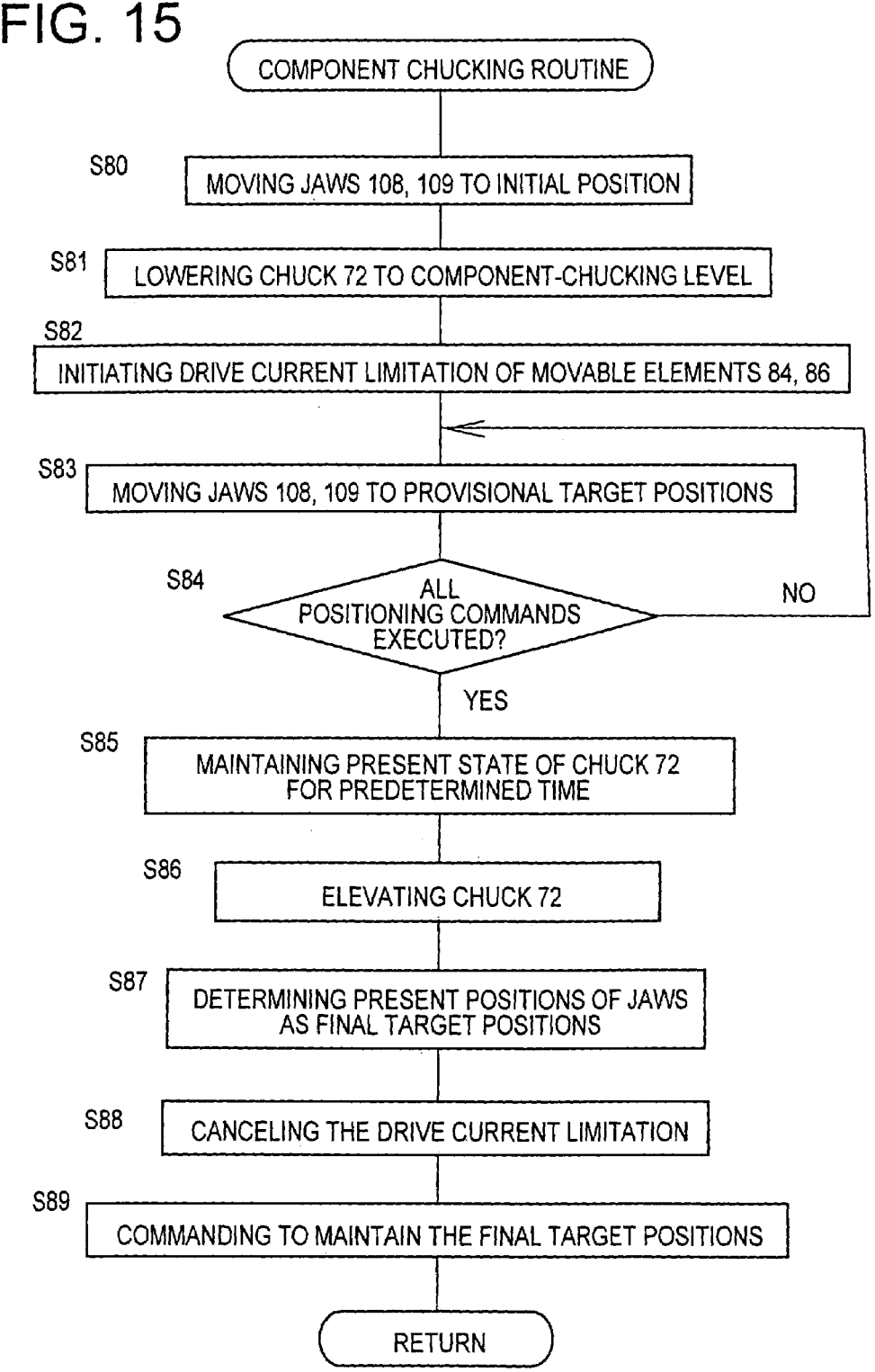
FIG. 15 is a flow chart illustrating a component chucking routine executed in still another embodiment of this invention.
Figure 16A:
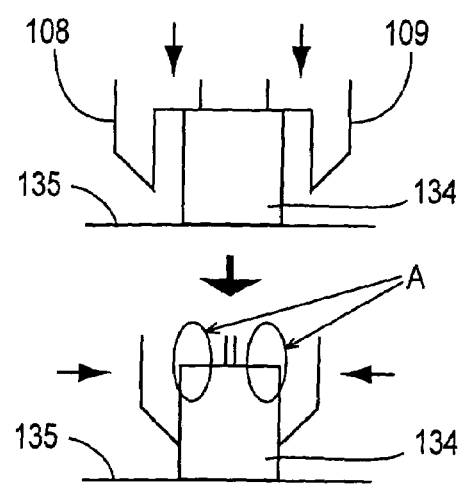
FIGS. 16A and 16B are views schematically showing a problem which may take place if the linear-motor-driven chuck is elevated while the chucking jaws of the chuck are maintained at final target positions determined before the elevation of the chuck.
Figure 16B:
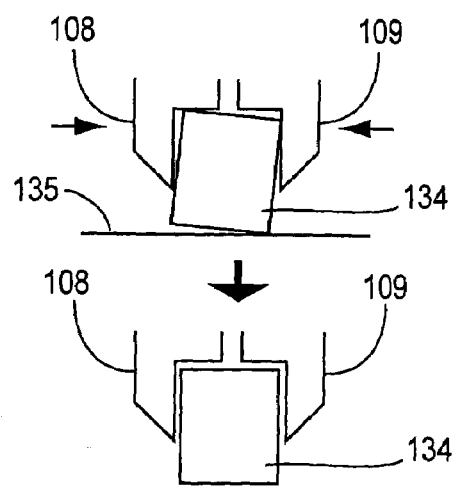
Figure 17:
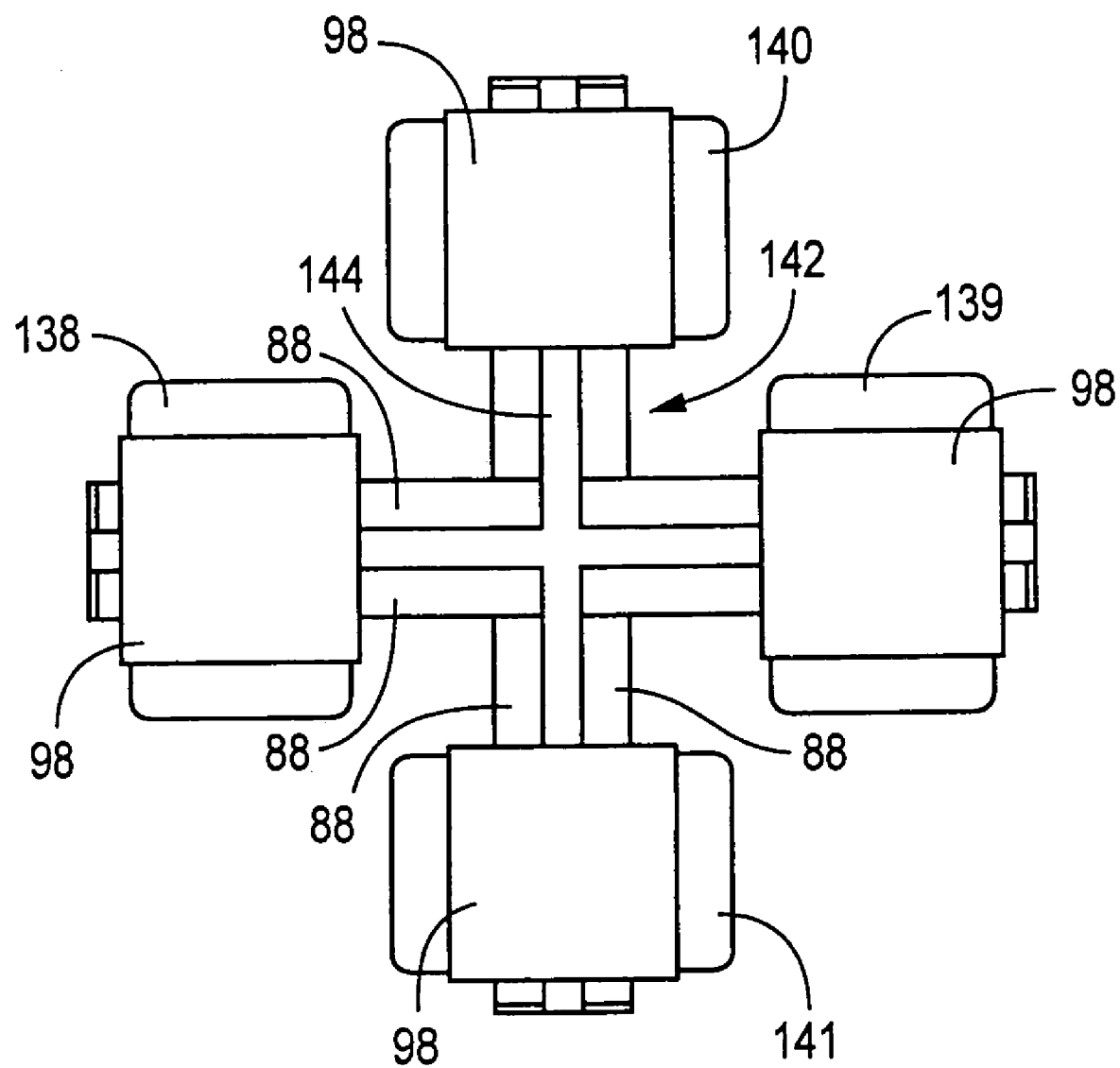
FIG. 17 is a bottom plan view of a linear-motor-driven chuck used in an electrically operated chucking device according to a further embodiment of the present invention.

Steps S80–S85 in the component chucking routine of FIG. 15 are identical with steps S60–S65 of FIG. 13. Step S85 is followed by step S86 in which the chuck 72 is elevated. After the electric component 134 held by the chuck 72 has been moved apart from the surface 135 of the component-supplying device 16, step S87 is implemented to determine the present positions of the chucking jaws 108, 109 as the final target positions. Step S88 is then implemented to cancel the drive current limitation of the movable elements 84, 86. Step S88 is followed by step S89 in which the chucking jaws 108, 109 are held at the determined final target positions. Thus, the final target positions are determined only after the electric component 134 has been moved apart from the surface 135, and the chucking jaws 108, 109 are held at the determined final target positions, which are not influenced by the friction force or any other external force and which are determined while the electric component is held by the chuck 72 in the nominal posture or attitude. Accordingly, the present embodiment assures an improved degree of operating stability of the linear-motor-driven chuck 72.

In the preceding embodiments, the chuck 72 is provided with a pair of chucking jaws 108, 109 movable toward and away from each other in one direction by the respective movable elements 80, 86. However, the principle of the present invention is applicable to an electrically operated chucking apparatus wherein a linear-motor-driven chuck 142 is provided with a first pair of movable elements 138, 139 movable relative to each other in a first direction, and a second pair of movable elements 140, 142 movable relative to each other in a second direction perpendicular to the first direction. In this sixth embodiment of the invention, the linear-motor-driven chuck 142 includes a stator 144 which has four arms which correspond to the respective four movable elements 138–141 and which extend in respective radial directions such that the four arms are equiangularly arranged in the rotating direction of the rotary shaft 62. Although the configuration and size of the electric components that can be held by the chuck 142 are comparatively limited due to a possibility of an interference between the adjacent movable elements 138–141, the electric components of relatively small sizes may be held by the chuck 142 where chucking jaws are attached to the respective movable elements 138–141 such that the chucking jaws are located radially inwardly of the radially inner ends of the movable elements 138–141. This chuck 142 is relatively advantageous in holding electrical components of asymmetric configurations.

While the several preferred embodiments of this invention have been described above, for illustrative purpose only, it is to be understood that the present invention may be embodied with various changes, modifications and improvements, such as those described in the SUMMARY OF THE INVENTION, which may occur to those skilled in the art. For instance, the electrically operated chucking apparatus of the present invention is applicable to not only an electric-component mounting system, but also any industrial equipment used in various fields of arts wherein various components, parts or members are held or chucked for any specific purposes.

What is claimed is:

1. An electrically operated chucking apparatus comprising:
   an electrically operated chuck comprising at least two movable members movable toward and away from each other, and at least two drive devices which include respective electrically operated actuators operable to move said at least two movable members, respectively, toward and away from each other; and
   a control device operable to control said at least two drive devices, and wherein said control device includes:
   a drive control portion operable to control said at least two drive devices such that each of at least one of an actual position and an actual speed of movement of each of said at least two movable members changes toward a predetermined target value; and
   a load detecting portion operable to detect a load acting on said at least two movable members during operation of said drive control portion to control said at least two drive devices,
   said drive control portion commanding said at least two drive devices to terminate movements of said at least two movable members when said load detected by said load detecting portion has increased to a predetermined threshold.

2. The electrically operated chucking apparatus according to claim 1, wherein said drive control portion includes a drive-commanding portion operable to generate control commands from time to time, for commanding said at least two drive devices, so as to control at least one of said actual position and said actual speed of movement of each of said at least two movable members.

3. An electrically operated chucking apparatus according to claim 1, wherein said load detecting portion includes a current detecting portion operable to detect an amount of electric current applied to said electrically operated actuators.

4. An electrically operated chucking apparatus according to claim 1, wherein said drive control portion includes a movement detecting portion operable to detect at least one of said actual position and said actual speed of movement of each of said at least two movable members, and drive control portion controls said at least two drive devices on the basis of an output of said movement detecting portion.

5. An electrically operated chucking apparatus according to claim 1, wherein each of said at least two movable members is provided with a chucking jaw having a gripping surface engageable with an outer surface of a gripping portion of an object to be held by said electrically operated chuck, and said drive control portion includes a provisional positioning control portion operable to control said at least two drive devices, so as to move said at least two movable members toward each other to respective predetermined provisional target positions at which an internal dimension of said electrically operated chuck generally defined by the gripping surfaces of the chucking jaws is smaller by a predetermined amount than an external dimension of said gripping portion of said object.

6. An electrically operated chucking apparatus according to claim 1, wherein each of said at least two movable member is provided with a chucking jaw engageable with an outer surface of a gripping portion of an object to be held by said electrically operated chuck, and said drive control portion includes an initial positioning portion operable to control said at least two drive devices, so as to move said at least two movable members toward respective predetermined initial positions at which the chucking jaws of all of said at least two movable members are spaced from the outer surface of said gripping portion of said object, by an equal distance, said drive control portion controlling said at least two drive devices to move said at least two movable members from said predetermined initial positions toward the outer surface of said gripping portion.

7. An electrically operated chucking apparatus according to claim 1, wherein each of said at least two movable members is provided with a chucking jaw having a gripping surface engageable with an inner surface of a gripping portion of an object to be held by said electrically operated chuck, and said drive control portion includes a provisional positioning control portion operable to control said at least two drive devices, so as to move said at least two movable members away from each other to respective predetermined provisional target positions at which an external dimension of said electrically operated chuck generally defined by the gripping surfaces of the chucking jaws is larger by a predetermined amount than an internal dimension of said gripping portion of said object.

8. An electrically operated chucking apparatus according to claim 1, wherein each of said at least two movable member is provided with a chucking jaw engageable with an inner surface of a gripping portion of an object to be held by said electrically operated chuck, and said drive control portion includes an initial positioning portion operable to control said at least two drive devices, so as to move said at least two movable members toward respective predetermined initial positions at which the chucking jaws of all of said at least two movable members are spaced from the inner surface of said gripping portion of said object, by an equal distance, said drive control portion controlling said at least two drive devices to move said at least two movable members from said predetermined initial positions toward the inner surface of said gripping portion.

9. An electrically operated chucking apparatus according to claim 1, wherein each of said at least two movable members is provided with a chucking jaw engageable with a surface of a gripping portion of an object to be held by said electrically operated chuck, and said drive control portion includes a deceleration control portion operable to reduce a speed of movement of said each movable member toward said surface of said gripping portion, when said chucking jaw has reached a predetermined deceleration-initiating position at which said chucking jaw is spaced from said surface of said gripping portion by a predetermined distance.

10. An electrically operated chucking apparatus according to claim 1, wherein said drive control portion includes a final-target-position holding control portion operable to determine, as final target positions of said at least two movable members, actual positions of said at least two movable members upon detection by said load detecting portion that said load has increased to said predetermined threshold, said final-target-position holding control portion controlling said at least two drive devices to hold said at least two movable members at said final target positions.

11. An electrically operated chucking apparatus according to claim 10, wherein said drive control portion further includes a load-detection inhibiting portion operable to inhibit the detection of said load while said at least two movable members are held at said final target positions under the control of said final-target-position holding control portion.

12. An electrically operated chucking apparatus according to claim 10, wherein said electrically operated chuck is movable to receive an object to be held thereby, from an object-supporting member, and said final-target-position holding control portion determine, as said final target positions, the actual positions of said at least two movable members after said object held by said electrically operated chuck is separated from said object-supporting member.

* * * * *